(12) United States Patent
Hardie et al.

(10) Patent No.: US 9,129,333 B2
(45) Date of Patent: Sep. 8, 2015

(54) METHOD AND APPARATUS FOR MANAGING LOCATION-BASED TRANSACTIONS

(75) Inventors: Mark E. Hardie, Ipswich, MA (US); Scott Eliot, Newbury, MA (US); Dean Andrews, Norwood, MA (US)

(73) Assignee: NOKIA CORPORATION, Espoo (FI)

( * ) Notice: Subject to any disclaimer, the term of this patent is extended or adjusted under 35 U.S.C. 154(b) by 885 days.

(21) Appl. No.: 12/821,083

(22) Filed: Jun. 22, 2010

(65) Prior Publication Data
US 2011/0313874 A1 Dec. 22, 2011

(51) Int. Cl.
*G06Q 30/00* (2012.01)
*G06Q 30/06* (2012.01)
*G06Q 30/02* (2012.01)
*H04W 4/02* (2009.01)
*H04W 4/18* (2009.01)
*H04W 4/20* (2009.01)

(52) U.S. Cl.
CPC ........ *G06Q 30/0639* (2013.01); *G06Q 30/0261* (2013.01); *H04W 4/02* (2013.01); *H04W 4/185* (2013.01); *H04W 4/206* (2013.01); *G06Q 30/06* (2013.01); *G06Q 30/0601* (2013.01)

(58) Field of Classification Search
CPC .......... G06Q 30/0251; G06Q 30/0259; G06Q 30/0261; G06Q 30/0601–30/0643; H04W 4/185; H04W 4/02; H04W 4/206
USPC .............. 705/14.4, 14.49, 14.5, 14.57–14.58, 705/14.62–14.64, 26.1–27.2, 319
See application file for complete search history.

(56) References Cited

U.S. PATENT DOCUMENTS

| 4,864,313 | A | 9/1989 | Konneker |
| 6,983,313 | B1 | 1/2006 | Korkea-Aho |
| 7,286,817 | B2 | 10/2007 | Provost et al. |
| 7,411,493 | B2 | 8/2008 | Smith |
| 2002/0059363 | A1 | 5/2002 | Katz et al. |

(Continued)

FOREIGN PATENT DOCUMENTS

| KR | 10-0645173 B1 | 11/2006 |
| WO | WO 2010/077960 | 7/2010 |

OTHER PUBLICATIONS

Friends at Hand and in Your Face: [FINAL Edition] Yuki Noguchi—Washington Post Staff Writer. The Washington Post [Washington, D.C] Dec. 29, 2006: D.1.*

(Continued)

*Primary Examiner* — William Allen
(74) *Attorney, Agent, or Firm* — Ditthavong & Steiner, P.C.

(57) ABSTRACT

An approach is provided for managing location-based transactions. A posting application determines to associate transaction information with a geographic location, the transaction information relating to one or more users. The posting application determines location information associated with respective devices of the one or more users. The posting application determines to transmit a notification related to the one or more transactions to the respective devices based, at least in part, on the location information.

19 Claims, 19 Drawing Sheets

(56) References Cited

U.S. PATENT DOCUMENTS

| | | |
|---|---|---|
| 2004/0203863 A1 | 10/2004 | Huomo |
| 2006/0075023 A1 | 4/2006 | Tenereillo |
| 2006/0099964 A1 | 5/2006 | Barrese et al. |
| 2007/0214180 A1 | 9/2007 | Crawford |
| 2008/0070588 A1 | 3/2008 | Morin |
| 2008/0133336 A1* | 6/2008 | Altman et al. ............... 705/10 |
| 2008/0172291 A1* | 7/2008 | Hurowitz et al. ............. 705/14 |
| 2008/0189189 A1* | 8/2008 | Morgenstern ................. 705/26 |
| 2009/0048922 A1* | 2/2009 | Morgenstern et al. ......... 705/14 |
| 2009/0170483 A1* | 7/2009 | Barnett et al. ............ 455/414.2 |
| 2010/0145784 A1 | 6/2010 | Sriver et al. |
| 2010/0240399 A1 | 9/2010 | Roumeliotis et al. |
| 2010/0293032 A1* | 11/2010 | Engelsma et al. ............. 705/10 |
| 2011/0258131 A1* | 10/2011 | Datars et al. ................ 705/319 |

OTHER PUBLICATIONS

JotYou: Location-Based Mobile Phone Messaging, Kishore, Feb. 11, 2008. Accessed: http://www.readwriteweb.com/archives/jotyou_location-based_mobile_phone_messaging.php, pp. 1-3.

Little World Gifts partners with WWF, location-based virtual goods up next, O'Hear Steve, TechCrunch, Mar. 1, 2010, http://eu.techcrunch.com/2010/03/01/little-world-gifts-parters-with-wwf-location-based-virtual-goods-up-next/, pp. 1-3.

Money Mailer, Coupons.com launch location-based iPhone app, Harnick, Chris, Oct. 20, 2009, http://www.mobilecommercedaily.com/money-mailer-couponscom-launch-location-based-iphone-app/, pp. 1-3.

* cited by examiner

100

200

400

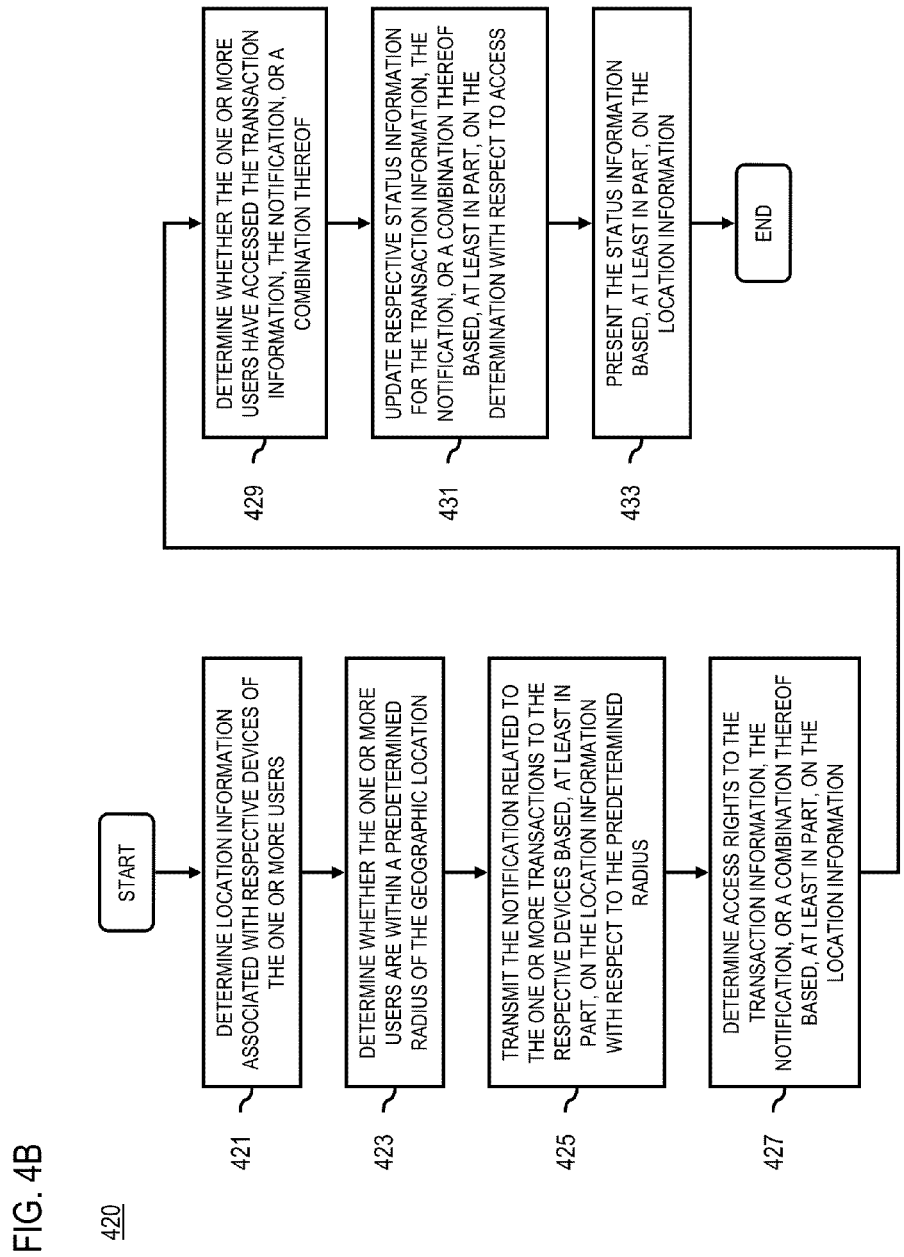

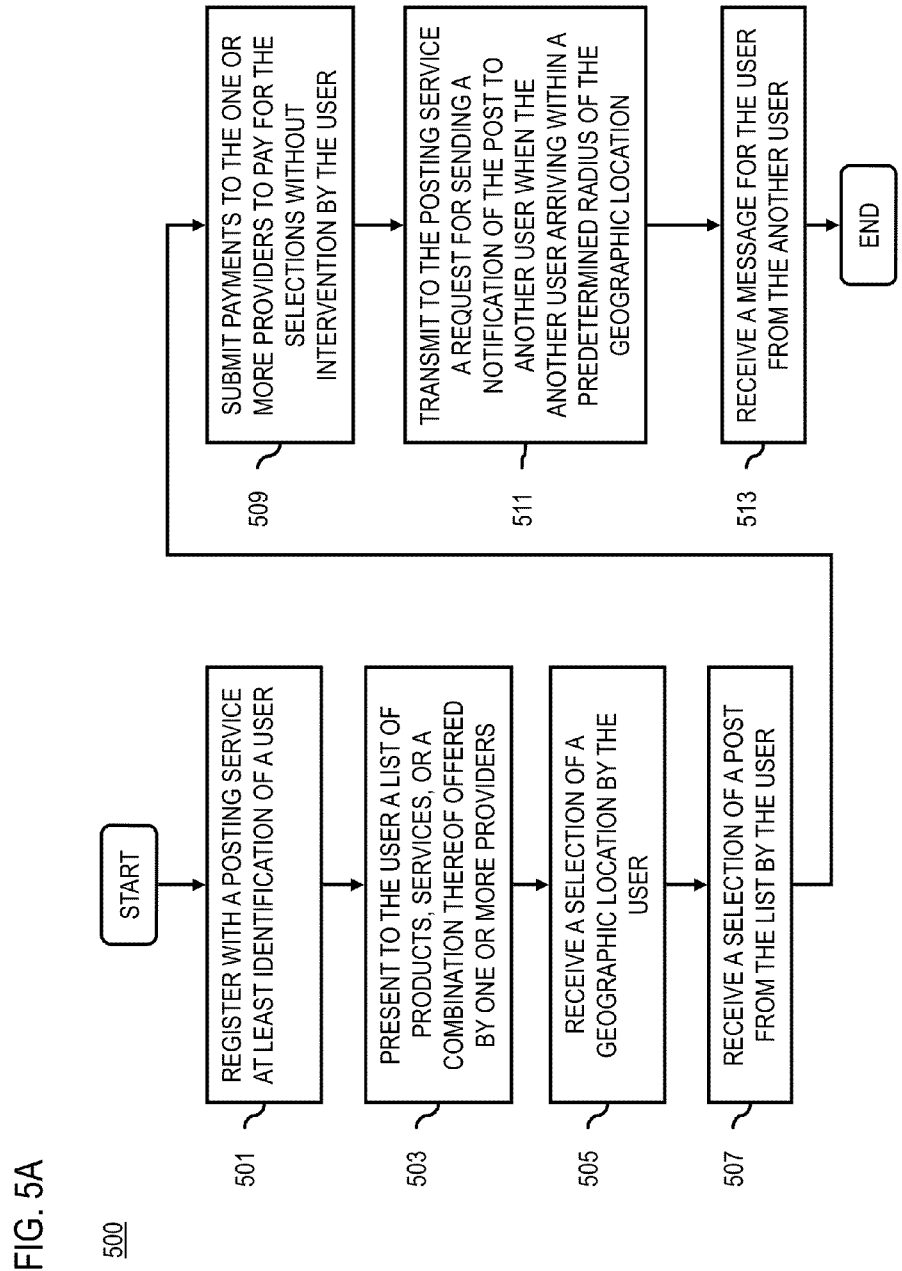

520

600

630

650

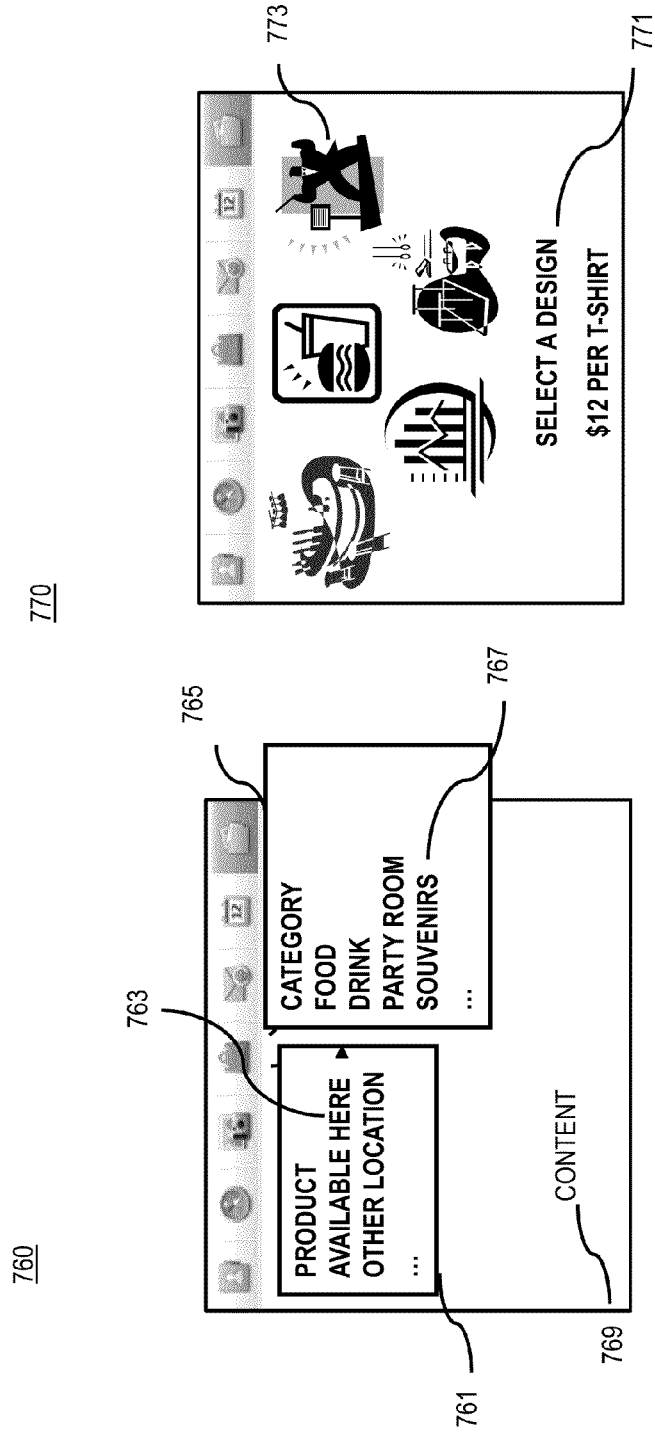

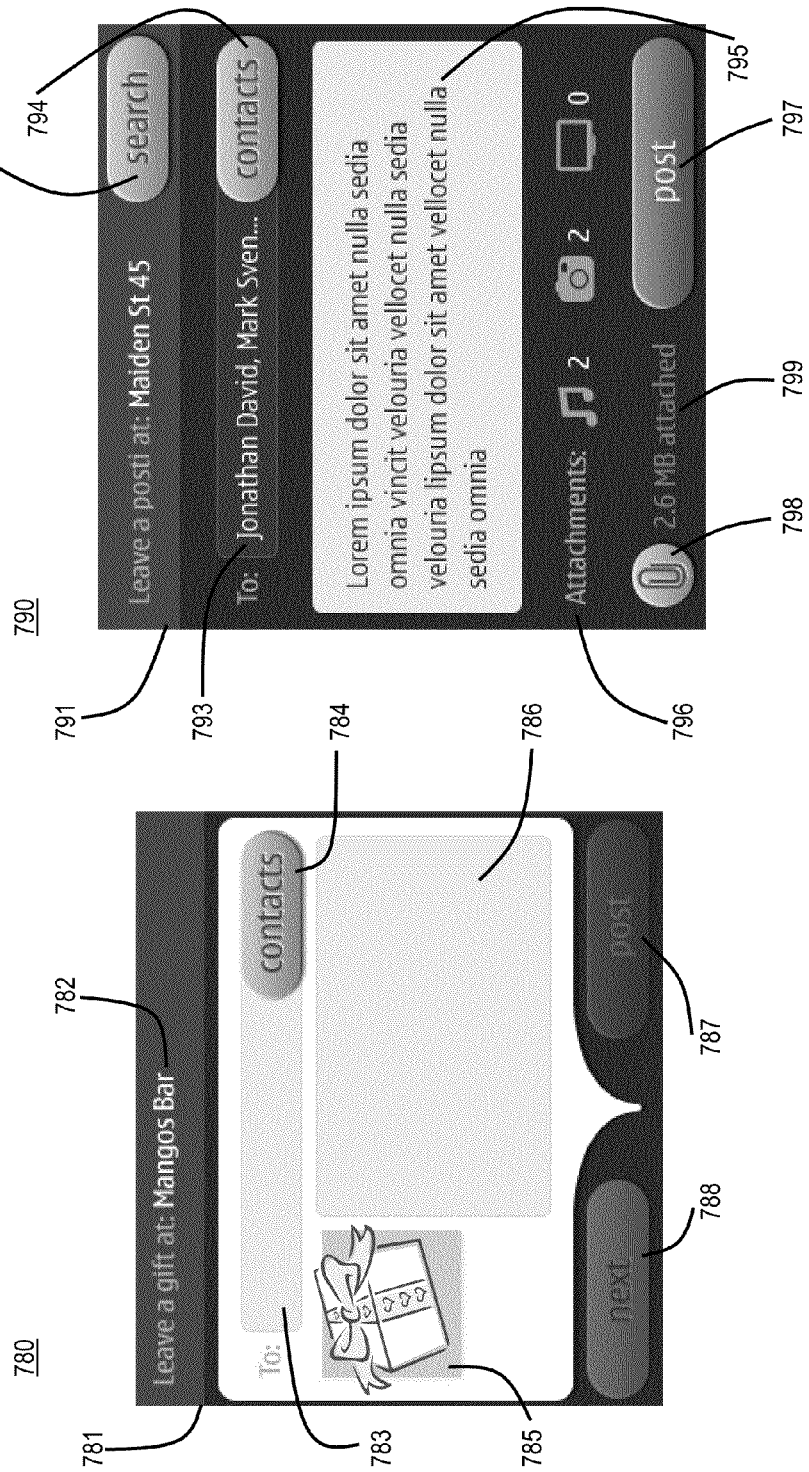

1000

METHOD AND APPARATUS FOR MANAGING LOCATION-BASED TRANSACTIONS

BACKGROUND

Service providers (e.g., wireless, cellular, Internet, content, social network, etc.) and device manufacturers are continually challenged to deliver value and convenience to customers by, for example, providing compelling network services and advancing the underlying technologies. One area of interest has been development of location-based services that are provided to users via devices and/or via a communication network (e.g., the Internet). For example, social location sharing services are becoming are a popular way for people to share their previous/current locations (e.g., restaurants, bars, etc.) and related experiences with their friends, family, coworkers, etc. It is further noted that service providers and merchants are seeking new ways to use such location-based data and services to, for instance tailor advertisements and promotions (e.g., coupons, discounts, etc.) or otherwise improve the user experience they provide as they interact or conduct transactions with their customers. Accordingly, service providers and device manufacturers face significant technical challenges to leveraging readily available location information to facilitate interaction between, for instance, merchants, businesses and their customers.

SOME EXAMPLE EMBODIMENTS

Therefore, there is a need for an approach for managing location-based transactions.

According to one embodiment, a method comprises determining to associate transaction information with a geographic location, the transaction information relating to one or more users. The method also comprises determining location information associated with respective devices of the one or more users. The method further comprises determining to transmit a notification related to the one or more transactions to the respective devices based, at least in part, on the location information.

According to another embodiment, an apparatus comprising at least one processor, and at least one memory including computer program code, the at least one memory and the computer program code configured to, with the at least one processor, cause the apparatus to determine to associate transaction information with a geographic location, the transaction information relating to one or more users. The apparatus is also caused to determine location information associated with respective devices of the one or more users. The apparatus is further caused to determine to transmit a notification related to the one or more transactions to the respective devices based, at least in part, on the location information.

According to another embodiment, a computer-readable storage medium carrying one or more sequences of one or more instructions which, when executed by one or more processors, cause the apparatus to determine to associate transaction information with a geographic location, the transaction information relating to one or more users. The apparatus is also caused to determine location information associated with respective devices of the one or more users. The apparatus is further caused to determine to transmit a notification related to the one or more transactions to the respective devices based, at least in part, on the location information.

According to another embodiment, an apparatus comprises means for determining to associate transaction information with a geographic location, the transaction information relating to one or more users. The apparatus also comprises means for determining location information associated with respective devices of the one or more users. The apparatus further comprises means for determining to transmit a notification related to the one or more transactions to the respective devices based, at least in part, on the location information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A, 4B and 4C are flowcharts of respective processes for facilitating a location-based transaction, according to various embodiments;

FIGS. 5A and 5B are flowcharts of respective processes for setting up a post and for retrieving a post, according to various embodiments;

FIGS. 7A-7H are diagrams of dialog boxes utilized in the processes of FIGS. 4 and 5, according to various embodiments;

DESCRIPTION OF SOME EMBODIMENTS

Figure 1:
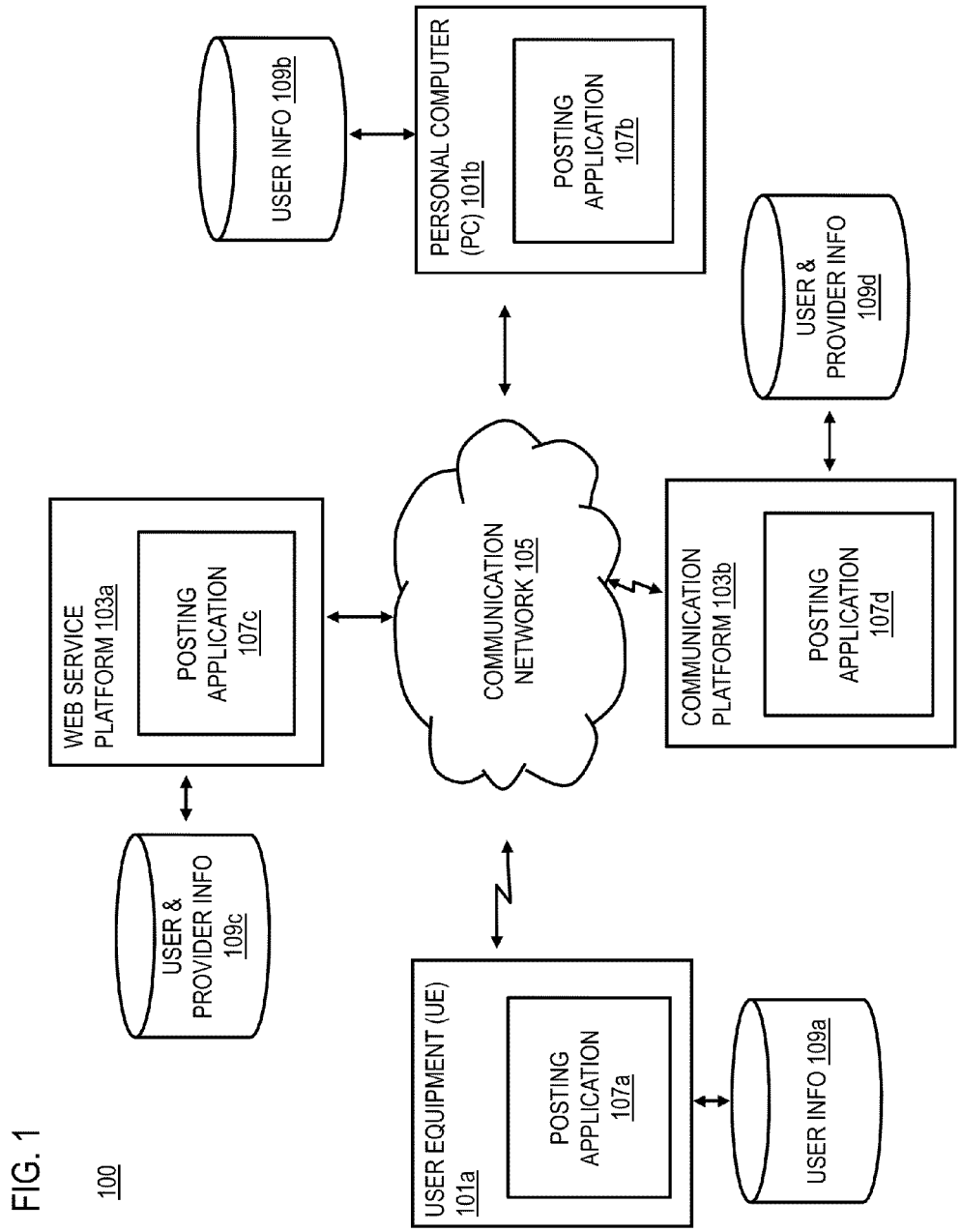
FIG. 1 is a diagram of a system capable of managing location-based transactions, according to one embodiment.

Examples of a method, apparatus, and computer program for providing the availability of services based on location information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "social commerce" refers a subset of commerce that involves using social media, online media, etc. to support one or more collaborative networks of online merchants, as well as social interaction and user contributions/reviews, thereby coordinating and facilitating advertising, marketing and transactions of products, services, or a combination thereof. Although various embodiments are described with respect to conducting transactions related to social commerce, it is contemplated that approach described herein is applicable to any transaction including those related to any other type of business-to-business (B2B), business-to-consumer (B2C), consumer-to-consumer (C2C), and/or consumer-to-business (C2B) commerce.

As used herein, the term "post" refers to (1) a tangible and/or intangible object and/or resource left for one or more recipients at a physical location to be notified to the recipients when they are physically present within a notification radius of the physical location; or (2) the action(s) to create and leave such an object/resource. The message communicates information and/or facilitates a transaction between users (including a business, a consumer, etc.). Tangible objects (e.g., physical products, paper money, etc.) or intangible objects (e.g., virtual products, services, etc.) given to a recipient to open near a specified location or to redeem at the specified location. Additional conditions (e.g., an expatriation date, a redemption period, limited quantity and first come first serve, etc.) may be imposed upon the gift. An object/resource can be described in a notification/alert to an intended recipient when the recipient gets near a particular location, and the notification may contain a link to a website to redeem intangible object/resource. Examples of physical products include foods, flower, candy, antique, etc. Examples of virtual products include media items (e.g., music, movies, eBooks, ringtones, etc.). Examines of services include gym membership, body massage, news/music/video channel subscription services, etc. Examples of resource include information, computing capabilities, storage space, services, credits, etc.

As used herein, the term "location-based service" (LBS) refers to an information service accessible through the network and utilizing the ability to make use of the geographical position of a terminal. Location-based services can be used in a variety of contexts, such as navigation, entertainment, health, work, personal life, etc. Location-based services include services to identify a location of a person or object, such as discovering the nearest banking cash machine or the whereabouts of a friend or employee. Location-based services include location-based commerce (e.g., trade and repair, wholesale, financial, legal, personal services, business services, communications and media,), location-based ecommerce (e.g., online transactions, coupons, advertising, etc.), hotels, real estate, renting, construction, dining, transport and travel, travel guides, mapping and navigation, parcel/vehicle tracking, personalized weather services, location-based games, etc.

Although various embodiments are described with respect to a message/gift, it is contemplated that the approach described herein may be used with other transactions involving exchanges of a post that includes a tangible and/or intangible object (e.g., products, currencies, housing, etc.) and/or resource (e.g., information, computing capabilities, storage space, services, credits, etc.).

FIG. 1 is a diagram of a system capable of managing location-based transactions, according to one embodiment. It is noted that the use of social commerce has grown extraordinarily. The consumers not only want to share product/service information online, but also want to leave their friends and contacts messages and samples of the products/services that their have experienced at a place (e.g., restaurants, etc). It is noted that currently if a user leaves another user a physical gift at a specified location, the user typically has to order the gift from a merchant, and request the location owner/operator to give the gift only to the recipient (e.g., by checking a photo identification). In addition, the user, in many cases, then informs the recipient to pick up the gift at the location during, for instance, the location's hours of operation. Accordingly, to provide a better user experience and enhance interactions between vendors and customers, there is a need to simplify the above described social commerce process.

To address these problems, a system 100 of FIG. 1 introduces the capability to manage location-based transactions. More specifically, the system 100 enables a first user to engage in location-based interactions with another user in the context of social commerce. By way of example, the transactions may involve sending a friend, a customer, etc. a post (e.g., a message, gift, etc.). For delivering or otherwise conveying such a post, for instance, the user first purchases the gift from a business and/or designated a message for delivery to a recipient at a particular location via the system 100. By way of example, the system 100 determines when an intended recipient is within proximity of a location associated with the post and then automatically notifying or reminding the recipient to pick up the post. In addition, the system 100 can also notify the business that provided or delivered the post that the post has been picked up by the recipient.

In one embodiment, the system 100 is a mobile-terminal based application that enables location-centric interaction between two parties. Like a yellow sticky note, a user (e.g., a consumer, a business, a non-profit organization, etc.) leaves a virtual 'sticky note' for someone (e.g., another user) in a particular place by associating the virtual note with a real physical location as requested by the user. When the user requests to leave a note (e.g., a message, gift, etc.) at the user's current location, the system 100 retrieves location data from a built-in GPS receiver of the user's mobile terminal, and creates a note anchored to the location (e.g., by recording the GPS coordinates and associating the coordinates with the note). When one or more intended recipients are within a defined physical radius of the geographic location where the note is affixed, the recipients receive a notification (e.g., visual, audible, textual, etc.) of transaction information on their mobile terminals. At that point, the message can be read and/or the gift can be redeemed. The message notifying the recipients of the gift can include text, audio, image, and video, or a combination thereof.

The gift can be tangible or intangible, and usually has monetary value. By integrating the system 100 with Internet payment services (e.g., PayPal®), the sender can select and pay for a gift for the recipient to redeem at a particular location. Working with merchant partners, the system 100 assembles merchant menus which list products/services that the partners are offering via the system 100 to the users. The user can select a gift item from the merchant menu, pay for the item, and then anchor the item for the intended recipient at a location. The location can be a merchant's establishment (e.g., a movie theatre, supermarket, restaurant, theme park, etc.). In one embodiment, the recipient can visit the merchant establishment to redeem the gift. By way of example, the item may also be physical or electronic gift cards representing a monetary value that the recipient can spend at the merchant's establishment.

The user can browse a website of the system 100 to register with the posting service (e.g., a service that coordinates or facilitates location-based transactions, notification, social networking, and/or messaging). In another embodiment, the user further downloads a client positing application to the user terminal. When browsing the website or opening the client application, a map is displayed representing the user's current location. Gifts and related messages/posts appear in the map as markers (e.g., icons, tags, etc.) representing read and unread messages, along with redeemed and unredeemed gifts. In one example, a human-shaped marker representing the user is also shown in the map within a circle of a predetermined notification radius. Any posts (e.g., messages, gifts, etc.) appearing inside the user's notification radius will launch a notification marker that appears on the user's mobile terminal to be selected by the user. When the client application or the browser is running in the background of the mobile terminal, the map may be invisible on the screen. However, a notification menu, dialog box, etc. can still appear on the screen of the user terminal.

As shown in FIG. 1, the system 100 comprises a user equipment (UE) 101a connected to a personal computer 101b, a web service platform 103a, and a communication platform 103b via a communication network 105. Each of the UE 101a, the personal computer 101b, the web service platform 103a and the communication platform 103b has a posting application 107 for posting transaction information and a database 109 for storing information. The web service platform 103a and the communication platform 103b may provide services such as music service, mapping service, video service, social networking service, content broadcasting service, etc. The UE 101a and the personal computer 101b respectively have databases 109a and 109b for storing user information. The web service platform 103a and the communication platform 103b respectively have databases 109c and 109d for storing user and provider information.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101a is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101a can support any type of interface to the user (such as "wearable" circuitry, etc.).

By way of example, the UE 101a, the personal computer 101b, the web service platform 103a, and the communication platform 103b communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
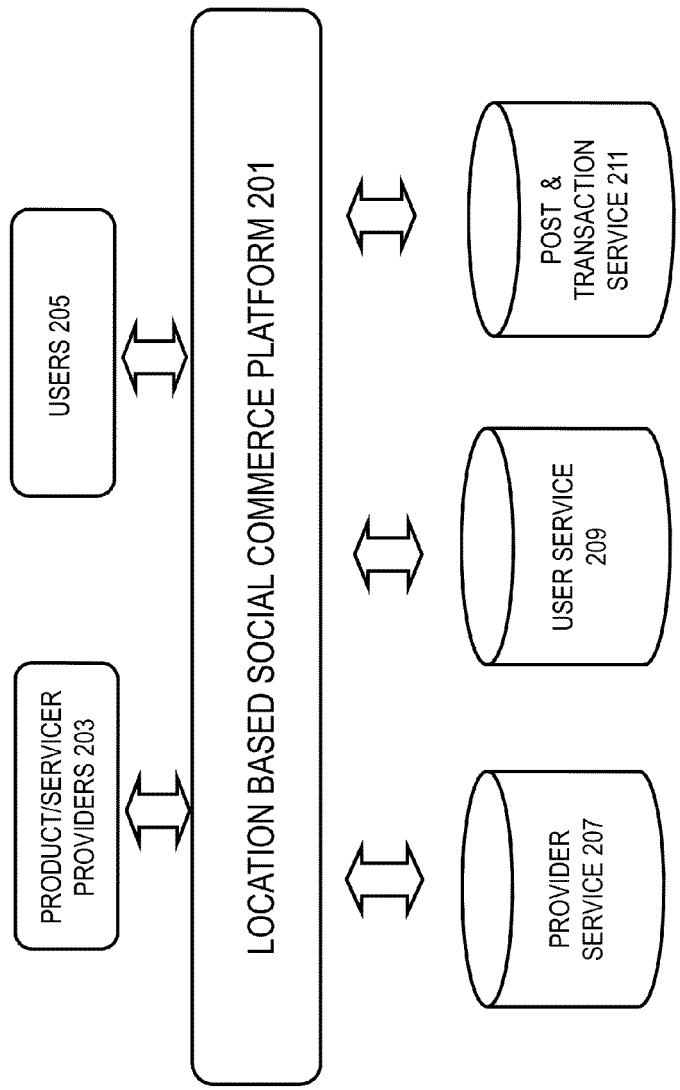
FIG. 2 is a diagram of the system of FIG. 1, according to one embodiment.

FIG. 2 is a diagram 200 of the system 100 of FIG. 1, according to one embodiment. In one embodiment, the system 100 deploys a location-based transactions platform 201 that provides services related to registering, marketing, and advertising products/services offered by one or more product/service providers 203 to one or more users 205, as well as coordinating and facilitating transactions through a provider service 207, a user service 209, a post and transaction service 211, etc. In other embodiments, two or more of these services are combined into a single service that performs the steps of the combined processes. The platform 201 includes centralized services invoked by the providers 203 and or the users 205 distributed across the network 105, such as the web service platform 103a, the communication service platform 103b, etc. The number of places may be managed by a single host or multiple hosts across the network 105 each responsible for a specific "area" and/or "country" of the world. In one embodiment, the platform 201 may be implemented via one or more existing service platforms (e.g., the web service platform 103a, the communication platform 103b, etc.). In another embodiment, the platform 201 is an additional platform that co-exists with the platforms depicted in FIG. 1.

The providers 203 can be any entity that offers tangible/intangible products, as well as services through the platform 201 for use in location-based transactions. The entity can be an individual, a business organization, a legal entity, etc. By way of example, the providers may provide tangible products such as electronics, sports good, foods, paintings, collectibles, vehicles, real estate, plants, etc.; intangible products such as electronically available files of documents, music, movie, games, etc.; services such as healthcare, legal, financial, engineering consulting, human resources management, marketing, advertisement, banking, event planning, tour-guiding, travel-booking, tutoring, career-coaching, hairdressing, massage, house cleaning, web café, etc.

The provider service 207 interacts with the providers 203 and maintains provider profiles and products/services information. The provider service 207 provides one or more provider/merchant menus that list the products/services by place, by provider, by product, by service, etc. A provider categorization is usually based on the whole web site and/or all products/services rather than one webpage or a set of keywords. A provider may be included in a few categories. The provider service 207 enables the providers 203 to directly register their products/services for inclusion in different categories, and/or reviews their submissions for fitness. The products/services information can be stored locally or externally depending upon the level of details requested by the users. By way of example, the provider service 207 only stores the name and provider of a product/service as well as a summary/teaser of the product/service locally, and retrieves other relevant information on the fly as demanded by a user. In another embodiment, the provider service 207 provides deep links to the provider's website. Purchase of products/services can be completed by, for instance, one click if the user has already registered payment information with the platform 201. In another embodiment, the providers link websites to platform 201 for the users to read more details of the products/services, and/or finish the purchase there. In one sample use case, a user is currently located at a restaurant/bar in New York City and initiates a gift purchase of a house-special drink for a friend to try when the friend visits the same restaurant/bar. On the friend's next visit to the restaurant/bar, the system 100 notifies the friend that he has a location-based transaction (e.g., the gift drink from the user) that can be redeemed at the restaurant/bar. If the product/service to leave for the friend is not available at the place (e.g., a birthday cake, a happy birthday song in a foreign language, a birthday song to be played by a live band, etc.), the user can search for the product/service by provider, by product, or by service, then pay for it and have it delivered to the place for the friend to pick up later.

In another embodiment, the provider service 207 also contains a collection of known places and optional contents. A known place is an entity that contains at least the place's ID and contents of the product/service related to that place. For those places associated with one or more of the providers 203, the provider service 207 maps and cross-references between the places (e.g., a department store) and the providers (e.g., designer clothes, cosmetics, jewelry, etc.).

The provider service 207 supports a search engine within the platform 201 for the user to search providers, products, and services, and places, in order to post a location-based transaction. In addition, the provider service 207 also provides marketing and advertisement services to the providers 203 to facilitate their use of location-based transactions. By way of example, the provider service 207 promotes and matches cross-marketing and/or marketing alliances among the providers to initiate location-based transactions for supporting marketing initiatives such as joint product development, co-branding, joint communications, co-advertising, joint sales measures, co-promotion, co-marketing, cross media, product bundling, sponsoring, branded entertainment, product placement, sales partnerships, licensing, etc. Therefore, the providers can effectively deploy their marketing resources and activities through the system 100 to reach the users and generate more location-based transactions.

In another embodiment, the provider service 207 provides advertising for the providers 203 that include contextual advertisements appearing on search engine results pages, banner advertisements, in-text advertisements, rich media advertisements, classified advertising, and e-mail marketing, etc., for location-based transactions.

When a provider registers a product/service, and/or a place associated with the product/service with the platform 201, the provider includes enough information (e.g., a name of the product/service and/or the place, metadata of the product/service and/or the place, etc.) for the provider service 207 to determine a degree of match with existing products/services and/or places in the platform 201. The registration can be submitted via a browser or a message. In one embodiment, the platform 201 provides web services that provide an HTTP based application programming interface (API) that follows the design principles for RESTful web services. Such a browser or a JavaScript based browser extension may directly support the HTTP-POST operation or directly create XML messages. The message can be an email, SMS, etc. The information can be included in the body of the message (e.g., an XML document in the body of an HTTP POST message) or in an attachment. Alternatively, a special client process, e.g., a platform client automatically provides some or all of the input required by the API using one or more HTTP messages.

The user service 209 interacts with the users 205 and maintains user profiles and user context/preference information. The user context/preference information can be stored locally or externally depending upon the level of details to be used by the system. The user service 209 enables the user 205 to directly register their information, and/or verifies their submissions for accuracy. By way of example, the user service 209 stores the name and identifier of a user as well as payment information locally, and retrieves other relevant information on the fly as required to provide other add-value services to the user. For example, the user service 209 accesses the user's social network webpage to retrieve a list of people who traveled with the user to Africa recently, so as to leave them a "African Dream" drink at an African Restaurant as gifts paid by the user. Therefore, the system 100 provides a new channel of social networking for the users to share interests and/or activities via posting location-based transactions and related messages or notifications.

The post and transaction service 211 interacts with the provider service 207 and the user service 209 to leave a post (e.g., a message, a gift, etc.) as requested by a user, and complete one or more transactions for the post. There are different kinds of charges associated with the post. The post and transaction service 211 may charge each provider and/or each user a monthly fee, a transactional fee, or a combination thereof. When a transaction involves more than one provider, each provider can impose separate charges for their products/services. By way of example, the Best Restaurant in Downtown New York charges for a drink ordered as a post, for serving a birthday cake ordered as another gift, for playing via its sound system the happy birthday song in the foreign language ordered as a third gift, for providing the space to the live band to play the birthday song ordered as a fourth gift, a bakery charges for the birthday cake and the delivery of the birthday cake, an online media store charges for the happy birthday song in the foreign language, and the band charges for the live performance, etc.

Figure 3:
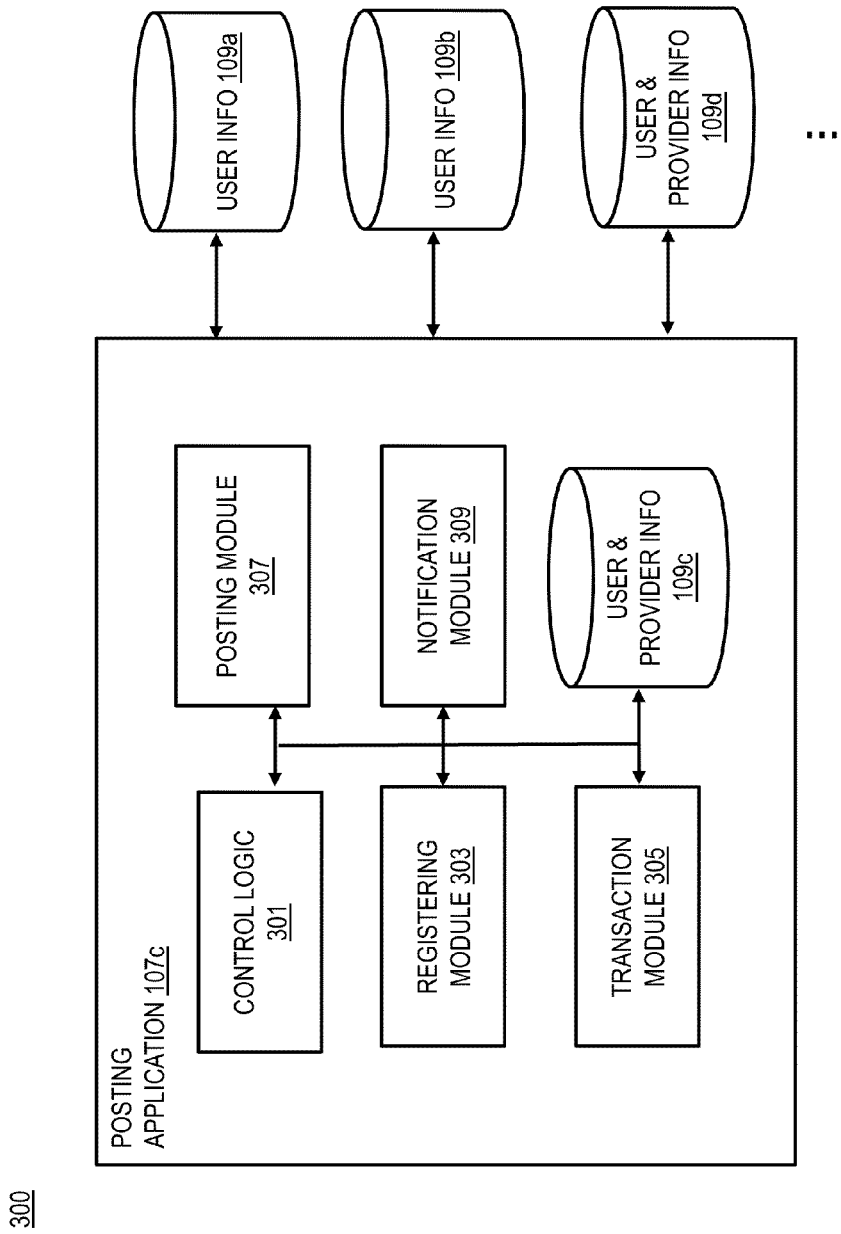
FIG. 3 is a diagram of the components of a posting application, according to one embodiment.

FIG. 3 is a diagram 300 of the components of a posting application, according to one embodiment. By way of example, the posting application 107c of the web service platform 103a includes one or more components for managing location-based transactions. It is contemplated that the functions of these components may be combined in one or more components or performed by other components of equivalent functionality. In this embodiment, the posting application 107c includes at least a control logic 301 which executes at least one algorithm for performing functions of the posting application 107c. For example, the control logic 301 interacts with a registering module 303 to register identification of users in the database 109c. The registering module 303 also registers provider profiles, and identification of products/services per provider and per categories.

The control logic 301 interacts with a transaction module 305 to receive a selection of a geographic location (e.g., a remote location, a current location, etc.) entered or selected by the user. The system 100 enables the user to post transaction information at a location outside their current physical locations ("remote posting"). In one embodiment, an interactive menu with a list of possible current locations is presented for the user to select a location. A list of suggested locations is provided by the provider service 207 and/or the user service 209. The provider service 207 considers the provider context (e.g., all available stores) and/or provider preferences (e.g., a newly opened store) to provide a list of locations. The user service 209 considers the user context (e.g., close to user's office, home, etc.) and/or user preferences (e.g., user's favorites) to provide a list of locations.

In another embodiment, the location is defaulted as the current location of the user. An approximate current location can be determined by using the current cell identifier, the current internet protocol (IP) address, global positioning system (GPS), assisted-GPS (A-GPS) or other means. The exact current location can be decided based upon the user context (e.g., prioritizing a when it is dinner time, prioritizing an ice cream shop when the weather is hot, etc.) and/or user preferences (e.g., prioritizing the most visited store at the same address when there are multiple stores at the location, etc.).

In one embodiment, the user uses a built-in scanner of the UE 101a to scan a bar code of a gift at home or at a store, and then uploads the selection to the transaction module 305. In another embodiment, the transaction module 305 presents to the user a list of products, services, or a combination thereof offered by one or more providers, in response to a user query. A gift may be in the form of money and exchanged via a third party monetary exchange service, such as PayPal®, Premium SMS®, a monetary exchange service of the system 100, etc.

The transaction module 305 receives a selection by the user from the list one or more gifts to be redeemed at the selected location, one or more media items to be attached to a message, or a combination thereof. In one embodiment, an interactive menu with the list of gifts available at the selected location is presented to enable the user to select the gifts. The list of gifts may be generated and sorted by the provider service 207 based upon provider context and/or provider preferences, the user service 209 based upon user context and/or user preferences, or a combination thereof. By way of example, the list of gifts is generated by the provider service 207 based upon provider context and/or provider preferences, and then sorted by the user service 209 based upon user context and/or user preferences. User inputs may be received via a touch-screen interface, a scroll-and-click interface, a button interface, a vocal user interface component, etc.

The provider context involves the availability of services, content, etc. The selection of a location can be affected by location restrictions (e.g., non-smoking, house rules, etc.), licensing agreements among providers, regulatory restrictions (e.g., no-under age drinking), etc. In certain embodiments, the system 100 can be utilized to block particular services based on the corresponding availability information.

Thus, the posting application 107c is geo-aware and is able to determine products/services that are available in a certain location. The location can also be used to select the language (e.g., English, Spanish, Chinese, etc.) used by the posting application 107c. In this manner, the providers can advantageously present information customized according to the respective locations of the users or users' UEs 101a.

The user preferences may include preferences of the user's, the recipient's, one or more social groups', one or more communities', or a combination thereof. The interactive menu may include selections of "what you like," "what he/she like," "what the group like," "most popular at the location," "most popular in the city," etc. By way of example, the user can introduce a new drink that the user just tried or the user likes. As another example, the user can give a new drink to the recipient who tried the drink and recommended it to the user.

The transaction module 305 further submits one or more payments for the selections by the user to the one or more providers without intervention by the user. In one embodiment, after the selection of the gift, the transaction module 305 automatically makes a secure remote payment for goods/services purchased by the user from a provider using the UE 101a by authenticating the user with the user identification, processing the payment based upon user's default payment method(s) for the selected location and gift. In another embodiment, the interactive menu interacts with the user to authenticate the user with a stored user identification or a new identification, to confirm the provider, the gift, the price, the location, the payment method (e.g., selecting an existing method, enter a new method, etc.), etc. The transaction module 305 may directly access the user's electronic wallet that includes a wallet identifier associated with an identifier specific to the user, means of payment, user profile, account information, etc. Several users may share one electronic wallet (e.g., a corporate wallet, a family wallet, etc.), and the same user may have access to several electronic wallets.

The control logic 301 also interacts with a posting module 307 to generate a post of a message and/or a gift based upon the selected location and the selected product/service. The posting module 307 also varies a predetermined radius of the geographic location based upon characteristics of one or more posts (e.g., messages/gifts), characteristics of the geographic location, or a combination thereof. The posting module 307 enables the user to post a message viewable by any user of the system 100 (a "public post"). The posting module 307 further enables the user a post a message targeting a defined group of registered users, not all of whom are in the user's contact list (a "group post"). The posting module 307 further enables a non-registered provider to post messages targeting a defined group of users (a "commercial post").

The control logic 301 also interacts with a notification module 309 to wirelessly transmit to the other user a notification which is a visual cue of transaction information, for example, that describes a post (e.g., a message, gift, etc.) and indicates the post is nearby. The notification is sent when the other user arrives within the predetermined radius of the geographic location. A notification can be saved at the UE 101a so as to be displayed even after the user travels away from the vicinity of the location, although the contents of the message cannot be read and the gift cannot be redeemed ("remote indexing"). A message can be re-read outside of the notification radius if the recipient has previously visited the location and read the message or redeemed an associated gift ("remote viewing").

The notification module 309 also transmits a notification to the user indicating that the other user reads the message, redeems the gift, or a combination thereof. When there are additional conditions imposed upon the gift (e.g., an expiration date, a redemption period, limited quantities, first come first serve, etc.), the notification module 309 transmits additional notifications to the user, such as "The message is expiring in two days," "the gift has to be redeemed in 24 hours," "sorry, you are too late; the last one of the ten ice cream cakes is gone," etc. The notifications and messages may be communicated over SMS, MMS, internet protocol, instant messaging, voice sessions (e.g., via a phone network), or other types of communication protocols.

The posting application 107a of the UE 101a has a control logic 301 control the execution of a browser/client application on the UE 101a to interact with the posting application 107c of the web service platform 103a. The posting application 107a may browse a web page of the system 100 via its uniform resource identifier (URI), uniform resource locator (URL), pointer, etc. The posting application 107a then has its registering module 303, transaction module 305, posting module 307, and notification module 309 interact with the respective modules of the posting application 107c of the web service platform 103a one behalf of the user as described above. The web service platform 103a may provide web pages dynamically based on the current location of the UE 101a as well as based on the user and/or UE 101a privileges and/or account information. Account information may include services that the user has paid for and/or otherwise has access to (e.g., the service fee is paid monthly or free).

In one embodiment, the posting application 107a of the UE 101a and the posting application 107c of the web service platform 103a interact with each other according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 4A:
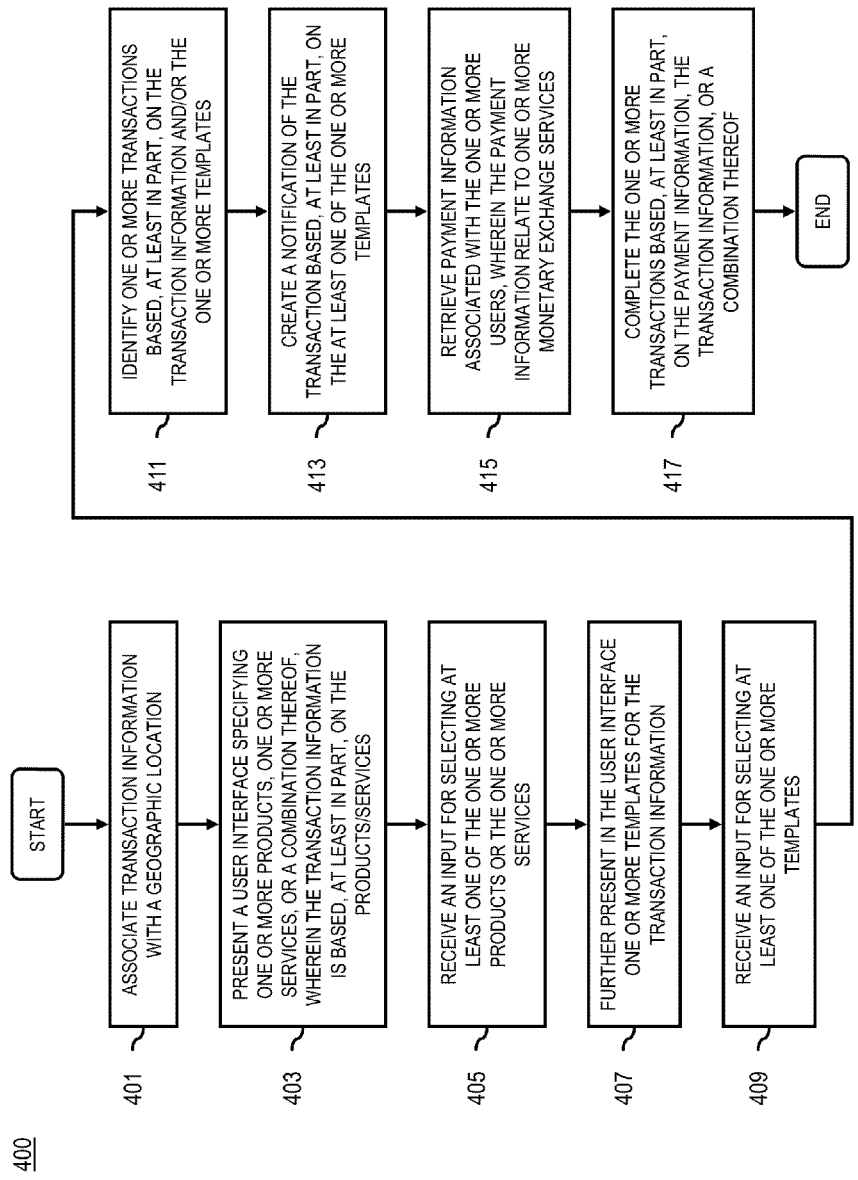
Figure 10:
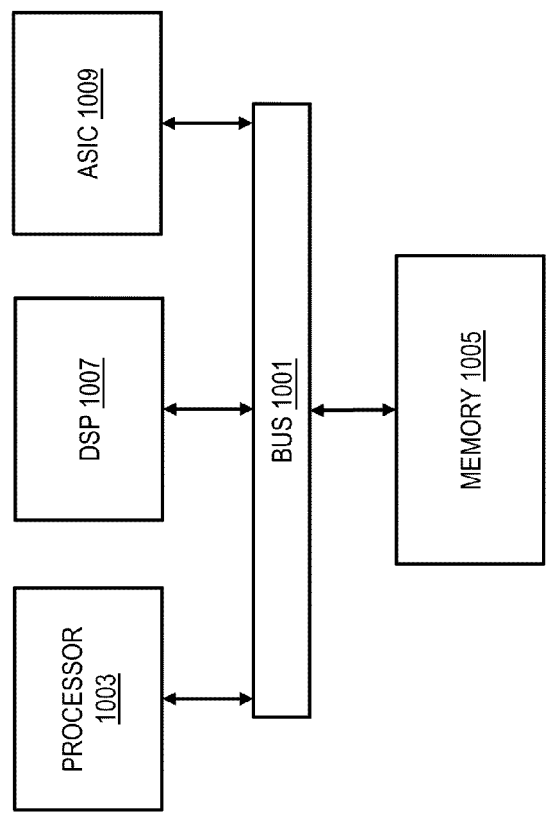
FIG. 10 is a diagram of a chip set that can be used to implement an embodiment of the invention.

FIG. 4A is a flowchart of a process for facilitating a location-based transaction, according to one embodiment. The process of FIG. 4A continues in FIG. 4B described below. In one embodiment, the posting application 107c of the web service platform 103a performs the process 400 and is implemented in, for instance, a chip set including a processor and a memory as shown in FIG. 10. In step 401, the posting application 107c determines to associate transaction information with a geographic location. The posting application 107c then determines to present a user interface specifying one or more products, one or more services, or a combination thereof (Step 403). The transaction information is based, at least in part, on the at least one of the one or more products or the one or more services. By way of example, the transaction information describes and/or specifies a post (e.g., involving tangible and/or intangible objects and/or resources) associated with a geographic location (e.g., a store), how to post/retrieve the posts at the location, cost for the post, provider information, etc. In one embodiment, the transaction information can be provided by the providers, the users, or a combination thereof to the system 100. In another embodiment, the posting application 107c uses data-mining algorisms, etc to extract the association information from the cloud and/or existing databases.

The posting application 107c determines to receive an input for selecting at least one of the one or more products or the one or more services (Step 405). The input may come from a consumer, a business, a non-profit organization, a governmental agent, etc. The product/service is available at the geographic location now or later (e.g., via delivery, etc.). The product/service may be offered by a provider located at, near, or outside of the geographic location. In one embodiment, the posting application 107c, automatically or on demand, arranges/orders delivery of the one or more posts to the geographic location.

Some services (e.g., media content) may be provided to the user via the mobile terminal 101a using a variety of approaches. For example, some services may be provided via a web page using an internet connection while other services may be provided using an application associated with a device at the geographic location.

The posting application 107c determines to further present in the user interface one or more templates for the transaction information (Step 407). In one embodiment, the template is designed for a user to easily fill in information such as user profile/preference, messages, product/service orders, or a combination thereof. In another embodiment, the template is designed for a provider to easily fill in information such as products/services, advertising/marketing/transaction related entries, or a combination thereof.

The posting application 107c determines to receive an input for selecting at least one of the one or more templates (Step 409). By way of example, when Matti wants to leave a product comment message (e.g., "Great electronic device!") and/or a gift (e.g., the electronic device) at a geographic location (e.g., the store, a supermarket, etc.), the posting application 107c determines to present to Matti a list of message options and/or a list of products/services offered by one or more providers. The messaging list can be as long as all Matti's contact, or as short as just one name (e.g., Alice). The product/service list can include just the new electronic device, or all products in the store, or all products of the store chain, etc. In another embodiment, the posting application 107c determines a language based on the current geographic location of the user, and presents the list in the determined language.

The posting application 107c determines to identify one or more transactions based, at least in part, on the transaction information and/or the one or more templates (Step 411). In another embodiment, the posting application 107c also determines whether the one or more selected products/services are legal and/or unrestricted (e.g., store policy, etc.) with respect to the geographic location, prior to rendering the list or prior to submitting payments.

In yet another embodiment, the posting application 107c sets an acceptance period for each of the one or more transactions based upon characteristics of the one or more products, the one or more services, or a combination thereof, characteristics of the geographic location, or a combination thereof. By way of example, for the new consumer electronic device carried in the store in a shopping mall, the posting application 107c suggests an acceptance period of three months to provide the flexibility of picking up while efficiently utilizing the store space.

The posting application 107c creates a notification of the transaction based, at least in part, on the at least one of the one or more templates (Step 413). By way of example, a provider of a new consumer electronic device requests to post a sale notification of the new consumer electronic device at a store to everyone within a fifty feet radius from the store. In another embodiment, the notification is targeted towards a particular group of people by determining the one or more users based upon one or more user profiles (e.g., game designers, computer geeks, etc.), preferences of one or more providers (e.g., loyal customers, etc.), or a combination thereof.

Continuing with the example, after Matti visits the store, Matti requests to post at the store a notification of the new consumer electronic device to all his classmates. After Alice one of Matti's classmates, visits the store, Alice requests to post at the store a notification of a post (i.e., the new consumer electronic device) to Matti. Alice decides to uses a credit card given by her mother to pay for the post. In this case, Alice is a third party of the post transaction because her mother will pay for the post.

The posting application 107c determines to retrieve payment information associated with the one or more users (e.g., Alice), wherein the payment information relates to one or more monetary exchange services (Step 415). The posting application 107c determines to complete the one or more transactions based, at least in part, on the payment information, the transaction information, or a combination thereof (Step 417).

FIG. 4B is a flowchart of a process continuing from FIG. 4A, according to one embodiment. In one embodiment, the posting application 107c of the web service platform 103a performs the process 420 and is implemented in, for instance, a chip set including a processor and a memory as shown in FIG. 10. In Step 421, the posting application 107c determines location information associated with respective devices (e.g., a smart phone) of the one or more users. By way of example, the location determination can be accomplished by subscribing to a location-based information service to receive real-time location notifications of the user device. The user device may be identified by user identification includes a globally unique ID number, such as a mobile equipment identity code assigned by a manufacturer of a user equipment (e.g., an international mobile equipment identity (IMEI)), a mobile subscriber identity code assigned by a mobile service operator to a subscriber during initiation of the user equipment (e.g., an international mobile subscriber identity (IMSI)), or a combination thereof.

The posting application 107c determines whether the one or more users are within a predetermined radius of the geographic location (Step 423). In one embodiment, the posting application 107c varies the predetermined radius of the geographic location based upon characteristics of the one or more products, the one or more services, or a combination thereof, characteristics of the geographic location, or a combination thereof. Before, during, or after receiving radius setting requests from the provider and/or the user, the posting application 107c can suggest different settings for the provider or user to consider. By way of example, the posting application 107c can suggest to post advertising information (e.g., a sale notification) so as to trigger a notification only within a relatively limited radius (e.g., 25 feet) from the store to reduce potential signal interference and/or overly burden users with marketing information. As another example, the predetermined radius for a person-to-person message or transaction left in the mall may be set as one mile so that the recipient (e.g., Matti) can get notifications of the message while he is driving or otherwise passing near the mall.

In another embodiment, when there are location-based transactions or transaction information (e.g., messages/gifts) left at two or more spots within the same locations (e.g., a candy shop, and a jewelry store), the posting application 107c displays two icons on the map when the user zooms in to a deeper level. The posting application 107c can set different radiuses for different transactions. For example, the predetermined radius for transactions related to a box of chocolates may be 5 feet away from the candy display shelf in the department store, and the predetermined radius for transactions related to an item in the jewelry store may be 50 feet. Therefore, the user will get the notification of transactions at the jewelry store at a longer distance than transactions at the candy shop.

Next, the posting application 107c determines to transmit the notification related to the one or more transactions to the respective devices based, at least in part, on the location information with respect to the predetermined radius (Step 425). The notification can be in a form of emails sent from the platform 201 via the internet to a user's device (e.g., UE 101a, a user RFID tag, etc.), or from a provider's or user's device (e.g., PC 101b) via a short range communication connection to the UE 101a. By way of example, a business/first class flight ticket holder receives a notification from an airline's onsite server or his VIP membership card/tag, when the holder is within 50 feet away from an airline VIP lounge in an airport terminal. A hotel guest receives at the UE 101a or a guest card/tag a notification of a fax, gift, and voice mail left at the front desk or at the hotel room from the hotel server or a room key card, when the guest is within the hotel premises.

In one embodiment, the posting application 107c determines access rights to the transaction information, the notification, or a combination thereof based, at least in part, on the location information (Step 427). The transaction information may relate to one or more products or one or more services redeemable by the one or more users. By way of example, when it is determined that the one or more devices are within the predetermined radius, the posting application 107c transmits the notification ("Matti, I have a gift for you.") to the one or more users. Matti has rights to access the description of the electronic device, but not the price or the payment information. On the other hand, when Alice cc. herself of the notification, she has full access to the transaction information.

The posting application 107c determines whether the one or more users have accessed the transaction information, the notification, or a combination thereof (Step 429). The posting application 107c updates respective status information for the transaction information, the notification, or a combination thereof based, at least in part, on the determination with respect to access (Step 431). The transaction information may include the status of one or more phases of a location-based transaction, such as whether the payment has been made, whether the notification of the transaction has been received, whether the gift has been redeemed, whether the redemption period has expired, and/or the status of any other phase of the location-based transaction. The posting application 107c determines to present the status information based, at least in part, on the location information (Step 433). By way of example, the posting application 107c transmits a notification ("Matti picked up Alice's message." and/or "Matti picked up the gift provided by Alice") to Alice and/or the one or more providers.

Figure 4C:
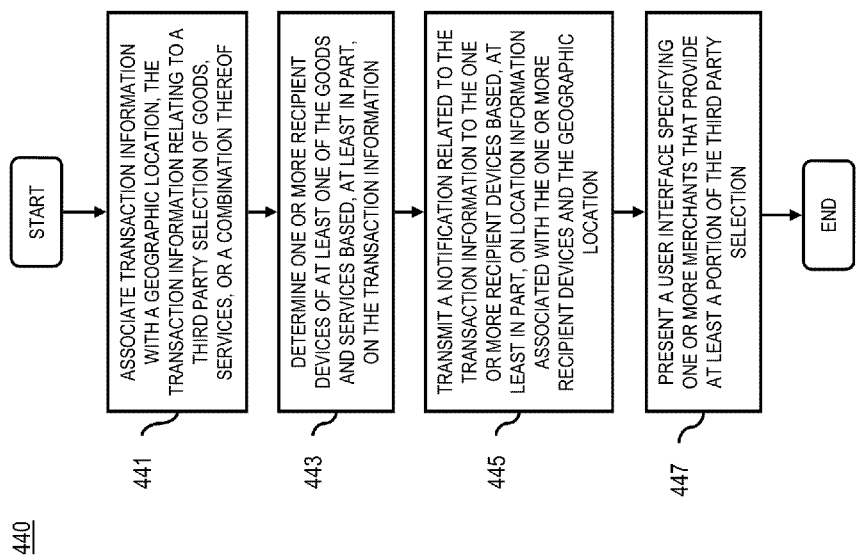

FIG. 4C is a flowchart of a process for facilitating a location-based transaction, according to one embodiment. In one embodiment, the posting application 107a of the UE 101a performs the process 440 and is implemented in, for instance, a chip set including a processor and a memory as shown in FIG. 10. In one embodiment, the providers (e.g., merchants, vendors, service providers, and the like) of goods/services interface with the system 100 via a web-based posting application 107a. By way of example, the posting application 107a is a portal application for business system data aggregation. Through the web page, a provider logs in to the system 100, establishes the setting of one or more Merchant Menus, and manages transactions and/or transaction information with users/customers using the Merchant Menus.

In step 441, the posting application 107a determines to associate transaction information with a geographic location. The geographic location may be one or more the provider's stores that are shown in a map with corresponding geographic data or representations of the geographic data, such as the provider' names and the street addresses of the stores. In one embodiment, the posting application 107a retrieves the geographic data based upon the provider's registration information from an existing retail business database (e.g., NavTeq). In another embodiment, the posting application 107a identifies all of the provider's stores on the map at once to set up the Merchant Menus for all of the stores. For a provider or merchant that has no "brick and mortar" location, the provider or merchant can use the system 100 by registering itself as a new virtual business associated with a place (such as a park, street corner, etc.) where, for instance, no other business resides. In certain embodiments, once the Posti system 100 approves a new virtual business, the system 100 can charge a fee for the registration.

In another embodiment, an operator of the system 100 may charge additional fees or otherwise restrict association between a prime location (e.g., a busy downtown street corner) and a particular virtual business. In some embodiments, the particular location associated with a virtual business may be assigned to a merchant based on time slots. For example, a merchant may rent or hire a specific location to associate with a virtual business by the hour, day, etc. rather than have a permanent attachment to a location. In yet other embodiments, the virtual business may be configured to move periodically from location to location. For example, a vendor may rent a location to associate a particular virtual business that moves along a certain route or changes location based on, for instance, an event (e.g., a parade route, a race circuit, a concert, a festival, etc.), time of day, and/or other context information.

In one embodiment, the Merchant Menus include a series of vertical panels each displaying, for instance, a product/service item, description, and price. The provider can update the Merchant Menus at any time, in a real time manner, using the web interface. For each product/service, the provide can upload the respective one or more images, insert textual, audio, visual, etc, descriptions, and assign one or more monetary values (e.g., regular price, discount price, etc.) thereto. In other words, the Merchant Menus constitute a virtual menu for the provider assigned with the geographic location in the system 100.

In another embodiment, the provider also selects one or more financial engines to support for processing payments for the transactions of the system 100. These engines may include PayPal®, Premium SMS, credit/debit/gift card entities, e-commerce entities, a monetary exchange service of the system 100, etc. By way of example, the payments may extend over the entire life-cycle of a product/service, such as base costs, shipping/delivery costs, system handling costs, etc. The provider user interface may include one or more financial engines, one or more menus associated with a third party selection of a post, one or more images associated with third party selection, or a combination thereof selected by the one or more providers/merchants.

After the Merchant Menus are created in the system 100, they are available for the consumers/user sees when are in proximity of the provider's geographic location. In another embodiment, the user can still access the Merchant Menus even after leaving the geographic location.

In one embodiment, the transaction information relates to a third party (e.g., a user) selection of goods, services, or a combination thereof. When the end user creates a post (e.g., a gift or other transaction) for one or more friends at a particular geographic location (e.g., the provider's store), the transaction or transaction information of the post would appear in the provider's account view on the web portal page, along with other pending and redeemed transactions.

The posting application 107a determines the one or more recipient users or devices (e.g., devices of the one or more friends) of at least one of the goods and services based, at least in part, on the transaction information entered by the consumer (Step 443). The posting application 107a determines to transmit a notification related to the transaction information to the one or more recipient users and/or devices based, at least in part, on location information associated with the one or more recipient and/or devices and the geographic location (Step 445).

The posting application 107a determines to present a user/provider interface specifying one or more merchants that provide at least a portion of the third party selection (Step 447). In one embodiment, the provider user interface includes one or more geographic representations of a physical or virtual location of the one or more providers, the location information associated with the one or more recipient users and/or devices, a physical or virtual location of one or more of the post (e.g., goods/services), the geographic location associated with the transaction information, or a combination thereof.

In addition to managing the Merchant Menus and transactions, the posting application 107a provides a mechanism for managing marketing, promotions, and advertisements that appear in the system 100, before, during, and/or after the transactions have been created. In one embodiment, a merchant menu is a short list of products/services that the provider wishes to promote. In another embodiment, all available products/services are listed in the Merchant Menu.

In another embodiment, additional promotions and/or advertising are sent as posts that customers see when they arrive in the proximity of the geographic location. As a result, the notification capabilities of the system 100 are used to further entice customers to visit the geographic location.

In yet another embodiment, the posting application 107a sends messages for and/or on behalf of the provider, the sender, and/or the recipient regarding the post and/or requirements for redemption, thereby managing the transactions created by the customers for redemption. The redemption may involve monetary changes and/or product/service changes that require the sender's approval and/or re-post to the system 100. The changes may incur payment changes as well, such that they require notification to the financial engines (e.g., PayPal®).

In yet another embodiment, customers of the provider may access at least a portion of the provider user interface to select goods and/or services to create location-based transactions (e.g., gifts) for one or more other users. In this way, the customer can, for instance, purchase a gift for another user that is tied to a particular location (e.g., a restaurant). Then, when the other user approaches the particular location (e.g., passes by the restaurant), the posting application 107a executing on the other user's device can receive notification of the availability of the location-based transaction at the location.

FIG. 5A is a flowchart of a process for setting up a post, according to one embodiment. In one embodiment, the posting application 107a resides in the user terminal 101a performs the process 500 and is implemented in, for instance, a chip set including a processor and a memory as shown in FIG. 10. In step 501, the posting application 107a registers with a posting service (e.g., Posti) at least identification of a user (e.g., Matti). If the user selects to leave another user a post (e.g., a message about a location and without any product/service or transaction information), the posting application 107a assembles the message with the location information for the user. By way of example, the message describes the geographic location (e.g., a gym), one or more activities of the user (e.g., free weight lifting) occurred at the geographic location, at least one of a tangible object (e.g., dumbbells) and an intangible object (e.g., background music in the gym) available at the geographic location, or a combination thereof.

If the user selects to leave another user a message attached with media contents or posts of commercial values, the posting application 107a determines to present (e.g., via a web browser) to the user a list of products (e.g., a gym t-shirt), services (e.g., one-on-one body building coaching), or a combination thereof offered by one or more providers (Step 503). The posting application 107a determines to receive a selection of a geographic location (e.g., the gym, Alice's house, etc.) by the user (Step 505). By way of example, instead of the gym, Matti may select to post a gift (e.g., a gym t-shirt) at Alice's house and has it delivered to her house. In this case, when Alice gets close to her house, she will receive a notification of the gift.

The posting application 107a determines to receive a selection by the user from the list one or more gifts (e.g., protein smoothie), one or more media items (e.g., a yoga video) to be attached to a message, or a combination thereof (Step 507). After receiving the selections, the posting application 107a determines to submit one or more payments to the one or more providers to pay for the selections (Step 509). The transaction information (e.g., involving a post) for the other user (e.g. Alice) is left by the user (e.g., Matti) when the user is within or outside of the predetermined radius of the geographic location (e.g., the gym). In other words, Matti can leave the transaction information to Alice when Matti is at the geographic location (e.g., the gym), or at a different location (e.g., a home, office, etc) after he left the gym.

The posting application 107a determines to transmit from the user to the posting service a request for sending a notification of the post (involving a message/gift) to another user when the other user arriving within a predetermined radius of a geographic location (Step 511). After the message is read and/or the gift is redeemed, the posting application 107a determines to receive a message for the user (e.g., Matti) from the other user (e.g., Alice), the message containing information that the message has been read by the user ("Thank for the information about the gym."), information that the one or more gifts has been redeemed by the user ("Thank you for the smoothies."), feedback of the other user regarding at least one of the message ("Your comments were encouraging.") and the gift ("The smoothes was delicious!"), or a combination thereof (Step 513).

Figure 5B:
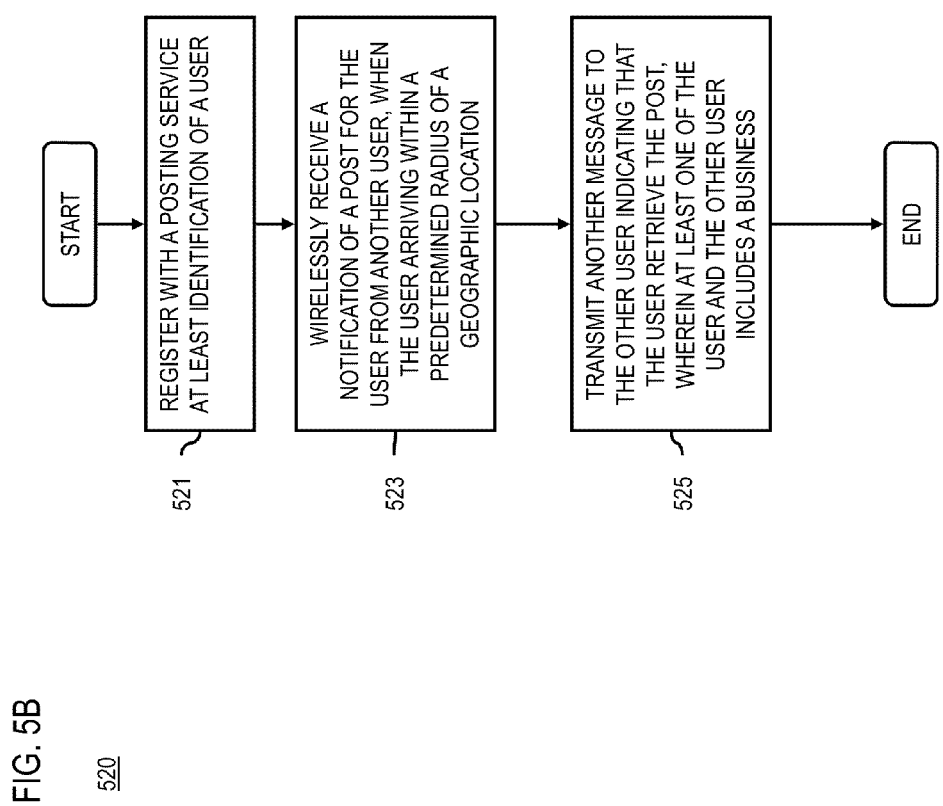

FIG. 5B is a flowchart of a process for retrieving a post, according to one embodiment. In one embodiment, the posting application 107a performs the process 520 and is implemented in, for instance, a chip set including a processor and a memory as shown in FIG. 10. In step 521, the posting application 107a registers with a posting service at least identification of a user (e.g., Alice). The posting application 107a determines to wirelessly receive a notification of a post. By way of example, the post includes at least one of a message (e.g., "You will enjoy the Movie. It reminds me our trip to Africa") and a gift (e.g., a ticket of the Movie) for the user from another user (e.g., Matti), when the user arriving within a predetermined radius of a geographic location (e.g., a movie theater) (Step 523). Thereafter, the posting application 107a determines to transmit another message to the other user (e.g., Matti) indicating that the user retrieves the post, for example, by reading the message (e.g., "The movie reminds me the trip, too."), redeeming one or more gifts (e.g., "Thanks for the movie ticket"), or a combination thereof (Step 525).

In addition, the posting application 107c supports a color-intensifying display mode for a selected post (e.g., a message/gift), such that the color of its icon changes as the user gets closer and closer to the location of the selected post. In another embodiment, the use selects a few posts in the color-intensifying display mode. Their colors can be intensified concurrently or sequentially. If the user wants to track them all at once, the mode is applied to them concurrently. If the user has a priority order for the posts, their color modes are triggered sequentially, such as by their proximity to the user's currently location, by their monetary values, etc.

In another embodiment, the posting application 107c of a recipient also can vary a predetermined radius of the geographic location based upon characteristics of one or more posts, characteristics of the geographic location, or a combination thereof. The radius settings were first set according to defaults or manually set by the sender or the provider, and then changed by the recipient. In one embodiment, the recipient sets the predetermined radius for all messages left in the department store as a mile away from the department store so the user can get notification while the user is in the neighborhood. By way of example, the recipient sets all messages related to a delivery service (e.g., a FedEx® server) to be notified within a five-mile radius of the user's house, so that when the user drives into the radius the user stops by to pick-up an item prior to arriving home. The posting application 107a enables the user to save time by receiving transaction information and sending reply messages in a simple manner.

Figure 6A:
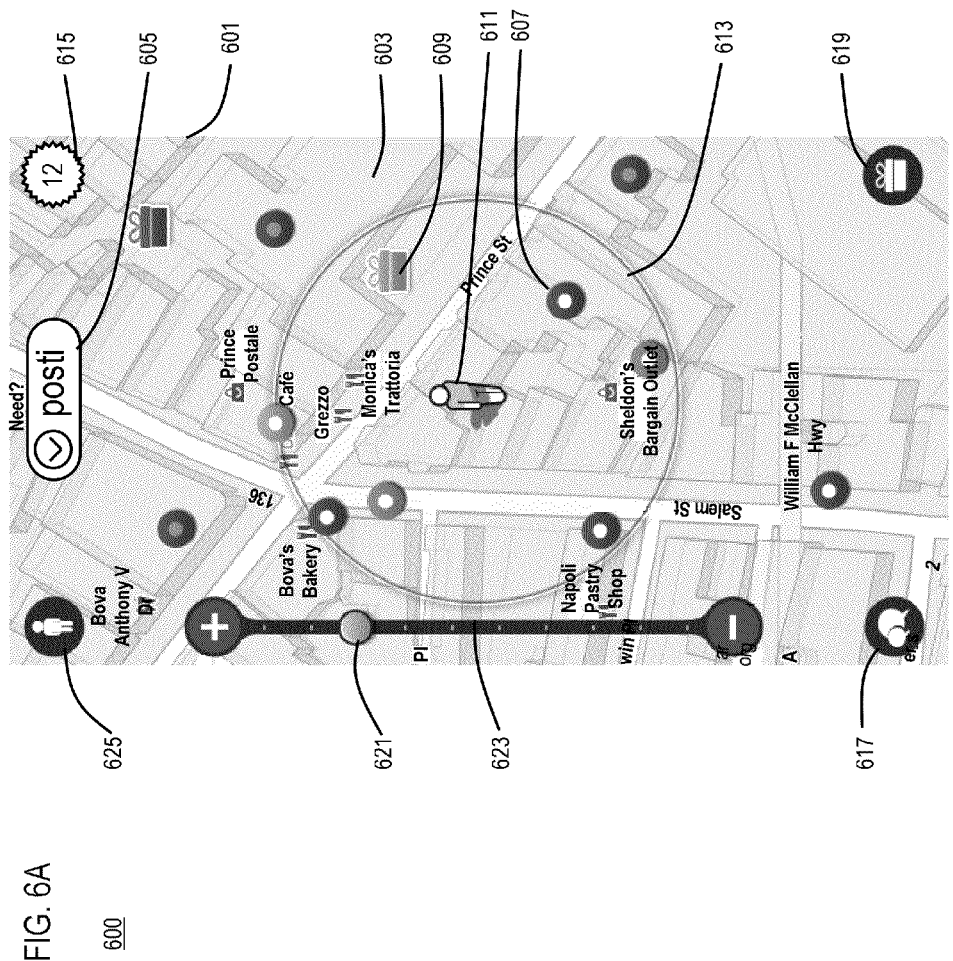
FIGS. 6A-6C are diagrams of user interfaces utilized in the processes of FIGS. 4 and 5, according to various embodiments.
Figure 6B:
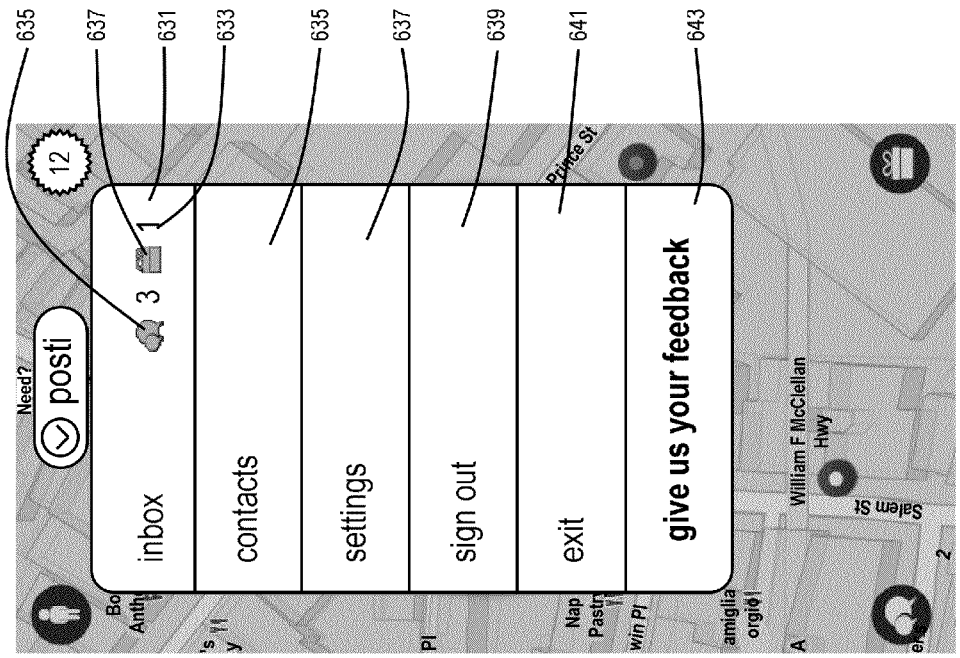
Figure 6C:
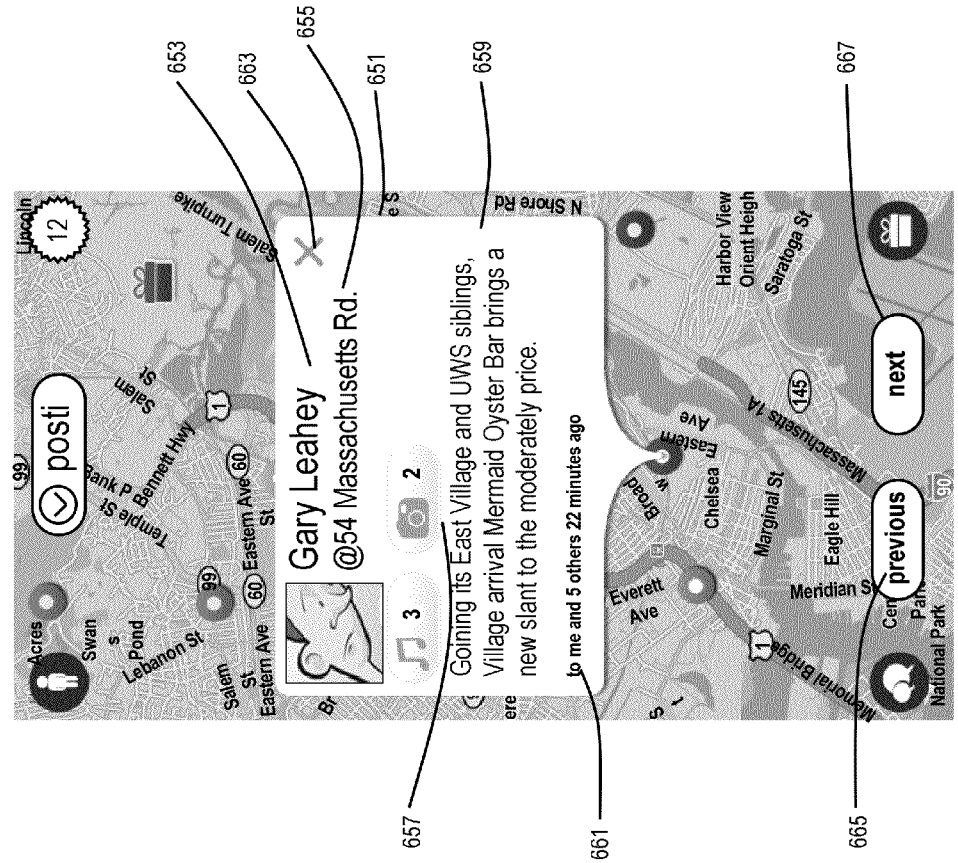

FIGS. 6A-6C are diagrams of user interfaces utilized in the processes of FIGS. 4 and 5, according to various embodiments. The user may browse a web page of the system 100 via its Uniform Resource Identifier (URI), a Uniform Resource Locator (URL), pointer, etc. The user then registers with the system 100 to reach a user interface 600 of FIG. 6A and set up a user ID and a password. After the registration, the user reaches a main screen 601. By way of example, the main screen 601 includes a map 603 as a background and an icon "posti" 605 on the top. By selecting (e.g., touching, clicking, etc.) the "posti" icon 605, a log-in screen pops up for the user to enter an ID and a password. Once the user has logged in the system 100 with the user ID and the password, markers (e.g., icons) of message notifications 607 and gift notifications 609, etc. show up on the map 603. In another embodiment, the map 603 is not available prior to user login.

The markers of message notifications 607 and the markers of the gift notifications 609 are shown with different colors according to their status. By way of example, a filled red circle with its center blank represents a message posted to the user—unread," i.e., available to be read in the My Inbox of the user. A filled red circle represents a message "posted to the user—unread," i.e., blocked post the user can read in my Inbox. A grey circle represents a message "posted to the user—read." The user can tap on a post icon to open up a dialog box. After closing the dialog box, if the post is unblocked to be read, it becomes already read on the map 603. An orange circle represents a message "posted by the user." In another embodiment, the read or unread messages posted by the user may have different representations. A red gift box represents a gift "sent to the user—not collected yet, a grey gift box represents a gift "sent to the user—already collected", and an orange gift box represents a gift "sent by the user".

A human-shaped avatar 611 represents the user and showing the user's current location on the map 603. A cycle is also shown on the map 603 indicating a limited notification radius 613 (as defined by the system and/or the user) that the user can receive a notification of transaction information and/or to read therein posts therein. An Inbox Notifications icon 615 shows how many new messages and gifts (e.g., 12) in My Inbox, regardless of the user's notification radius or map zoom level.

When the system 100 is launched at the UE 101a, an on-board global positioning system (GPS) receiver automatically searches for the user current location. It may take some seconds to process the GPS signal. When the posting application 107a is launched, the map shows a previous user location while searching for the current user location. A black and white avatar is shown to inform the user that the previous location rather than the current location is displayed, while no reading radius is shown. While the search is running, the user can browse the map and explore the posting application 107a. If the user taps on a "my location" icon, the map is led back to the previous location when the current location is not yet found.

When the GPS signal is found, the current location of the user and the notification radius are defined. A color avatar and a notification radius are shown on the screen. If the user moves out of the current location, the display can be led back to the current location by tapping on the "My location" icon.

If the GPS signal is not available (e.g., indoors or enclosed areas), a triangulation signal can be used instead, although the triangulation signal is not as accurate as the GPS signal. The same color avatar and notification radius are shown on the screen, as when a GPS signal is used. If the user taps on the "my location" icon, the system 100 tries to find the GPS coordinates again. Meanwhile, the user can browse the map and explore the posting application 107a. Even if the user doesn't tap on the "my location" icon, a new search will run within a few minutes or when the user tries to leave transaction information (e.g., involving a post).

When neither a GPS signal nor a triangulation signal is found, the system 100 shows an alert dialog box "Posti can't find your location". The same black and white avatar is shown to inform the user that the previous location rather than the current location is displayed, as in the situation that the system 100 is searching for the GPS signal. The notification radius is not shown either. The system 100 offers the user options of "cancel" or "retry". When the user selects "cancel", the system 100 closes the alert dialog box and shows in the map the last detected location. If the user taps on the "my location" icon, the system 100 tries to find the GPS coordinates again. Meanwhile, the user can browse the map and explore the posting application 107a.

A "Leave a message" icon 617 and a "Leave a gift" icon 619 are available for user to select to trigger the relevant functions. The user can tap on the "Leave a message" icon 617 to leave a message at the selected location, and/or tap on the "Leave a gift" icon 619 to leave a gift at the selected location. In another embodiment, the user can press a point on the map 603 for a predetermined time period (e.g., 15 seconds) to open up a dialog box over the map 603 to post transaction information (e.g., involving a post) inside or outside of the notification radius.

A default zoom tab 621 of the map can be set by the system and/or the user to show the whole "notification radius" 613 within the screen. In another embodiment, the default zoom tab 621 is varied according to the nature of the user's point of interest. The notification radius may be set as 15 miles when the user just gets back to town from a trip, so the user can see all the messages and gifts posted in the town. The notification radius may be set as 5 miles when the user just gets off work, so the user can see all the messages and gifts posted on the way home. The notification radius may be set as 50 feet when the user is shopping in a mall, so the user can see all the messages and gifts posted in different stores in the mall. The notification radius may be set as 5 feet when the user is shopping in a book store, so the user can see all the messages and gifts posted on different shelves in the bookstore.

A Zoom control bar 623 "floats" over the map 603. Not all of the messages and gifts shown in the current zoom level of the map can be read or redeemed. Some of them were notified to the user and saved in My Inbox when the user was in the notification radius lat time, but the user did not read the message or redeem the gift. In other words, any post once found by the system within the notification radius goes into the Inbox and stays there, even those the user "ignores" (i.e., notified previously but not read). Therefore, there are posts not within the current notification radius are available to read in the Inbox. For the other ones unread, if the user taps on them, a specific message will be shown but the message of the post won't be opened. A gift can only be collected when the user is at the location. In this case, the user can read the notification outside of the notification radius, but cannot read a message outside of the notification radius.

The user can freely browse the map by selecting and moving a "Drag the map" icon. If the user browses the map and navigates the view outside of the current location and/or the notification radius 613, the user can selects a "My location" icon 625 to lead the avatar 611 back to the current location and/or in the notification radius 613.

The user can select the icon "posti" 605 to call out an Options Menu as shown in FIG. 6B. FIG. 6B shows on a user interface 630 an Options Menu 631 includes taps of Inbox 633, Contacts 635, Settings 637, Sign out 639, Exit 631, and "Give us your feedback" 633. The Inbox tap 633 is shown sis-by-side with a message icon 635 and a gift icon 637 with their respective numbers (e.g., 3 and 1). In other words, the user has three posts and one gift available in the Inbox (which lists all users' posts (e.g., messages/gifts), read or unread, redeemed or not redeemed, etc.).

Selecting the Contact tab 635 leads to a contact screen. Some or all the listed users are registered with the system 100. By way of example, a list of contacts is shown with their photos, names, and identification numbers of sent/read messages and/or sent/redeemed gifts with respect to the user. The screen also provides a "New Contact" icon for marking new contacts, a "Favorites" icon for marking favorite contacts, a "Sort" icon for sorting contacts, a "Search" icon for searching contacts, etc.

Selecting the Settings tab 637 leads to a Settings screen for the user to set all different kinds of settings, such as settings regarding the notification radius (e.g., defaults, by point of interest, etc.), display/sound settings of the messages, gifts, screens, icons, etc., security settings for reading messages, redeeming gifts, etc. By way of example, the user can set a secret question for the recipient to answer before reading a message or redeeming a gift, in order to authenticate the recipient in case that the UE 101*a* is lost.

Selecting the Sign-out taps 639 leads the user to a log out screen to sign out. The Exit tab 641 closes the application after user selection. In another embodiment, a dialog box pops up to ask the user if the user wants to keep the system 100 running in background. If selected, the posting application 107*a* stays opened but runs minimum operations in the background. For example, the posting application 107*a* will inform the user if encounters new posts (e.g., messages/gifts) without requiring much resources of the UE 101*a*. The system 100 then can be accessed by selecting an "alt tab" or closing the browser. The "Give us your feedback" tap 643 points to a link to an online user survey form.

The user can tap on any icon on the screen to open a new dialog box concurrently with or in place of an existing dialog box, depending upon the settings. When the user selects a post icon on the map, a post reading dialog box 651 is called out as shown in FIG. 6C. FIG. 6C shows on a user interface 650 the post reading dialog box 651. By way of example, a sender ID (e.g., a name, photo, etc.) 653, a sender's address/venue 655 (e.g., 54 Massachusetts Rd.), media attachments 657 (e.g., 3 songs and 2 photos), a message 659, and message recipient information 661 are displayed in the post reading dialog box 651.

The media files attached to the message can be opened by selecting the music and photo icons. In one embodiment, the message 659 has a length limitation (e.g., 140 characters maximum). In another embodiment, the post reading dialog box 651 displays only a portion of the message 659 that is within the length limitation.

The message recipient information 661 may include time and a recipient number (e.g., sent to me and five others 22 minutes ago). The setting of the message recipient information may be set by the system 100 and/or the user. For example, message time information rules are set to show per minute within the first hour (1 minute ago—until 59 minutes ago), per hour within the first day (1 hour ago—until 23 hours ago, as yesterday after the first day, and as moth/day/year (e.g., Jun. 13, 2010) after the first two days. Message recipient information rules are set to show the number of recipients other than me (e.g., to me and five others, to me and another one, etc).

There is also a "Close the Post" icon 663 at the top right corner of the post reading dialog box 651. The post can be closed by selecting the icon 663 or tapping out of the post reading dialog box 651.

The user interface 650 also shows a "previous" icon 665 and a "next" icon 667 to enable the users to browse the received items by sender, by age, by proximity, or by other condition or priority set by the system and/or the user, with respect to the currently read post. By way of example, the order of the posts is conditioned upon their proximity to the current location of the user or the location of the currently read post. In other words, the next post is the closest unopened post to the current user location or to the currently read post. When the user opens a first post, the "previous" icon 665 is unavailable, and when the user opens a second post, the "previous" icon 665 becomes available. When the user opens the last post on the map, the "next" icon 667 becomes unavailable. The "next" and "previous" icons 665, 667 only appear when there are at least two posts (e.g., messages/gifts) on the map.

FIGS. 7A-7H are diagrams of dialog boxes utilized in the processes of FIGS. 4 and 5, according to various embodiments. The dialog boxes can be shown on the map 603 of FIG. 6 or on top of other applications when the system 100 is running in the background.

Figure 7B:
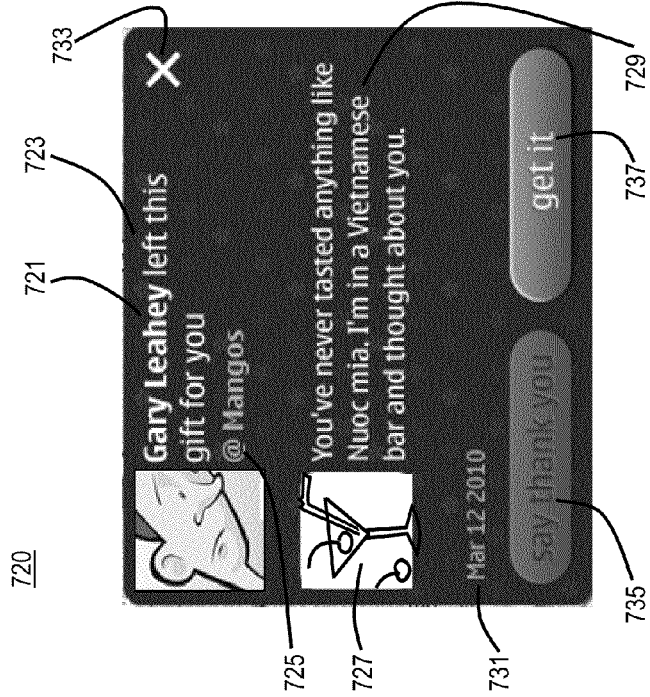
Figure 7A:
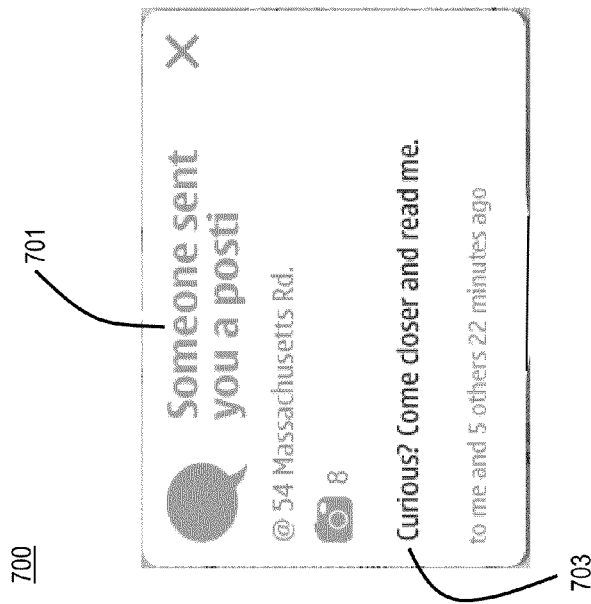

When the user cannot or does not want to read a post at its first arrival at the UE 101*a*, the post is recorded in the system 100 and shown on the map in a special dialog box as shown in FIG. 7A when the user subsequently visits the neighborhood. FIG. 7A shows a post reminder dialog box 700 with a header 701 "Someone sent you a posti". Different messages can be shown in the post reminder dialog box 700 according to the posting time. For example, if the posting time is within one week, the message of "Curious? Come closer and read me" is shown in the dialog box 700. If the posting time is one week old or older, the message of "I'm getting old and feeling so lonely here. Come closer and read me" is shown in the dialog box 700.

Instead of a message, the user can select a gift box icon on the map, and triggers a dialog box as shown in FIG. 7B. FIG. 7B shows a gift notification dialog box 720 showing a header "(Name) left this gift for you". By way of example, a sender ID (e.g., a name, photo, etc.) 723, a sender's address/venue 725 (e.g., Mangos), a gift image 727 (e.g., a photo of the gift/drink: Nuoc mia), a message 729, and gift sender information 731 are displayed in the gift notification dialog box 721.

In one embodiment, the message 729 has a length limitation (e.g., 140 characters maximum). In another embodiment, the gift notification dialog box 721 displays only a portion of the message 729 that is within the length limitation. The gift sender information 731 may include a time the gift (e.g., Mar. 12, 2010). The setting of the gift sender information may be set by the system and/or the user. The sender may eliminate the message sender information 731 or even the sender ID 723, to remain anonymous.

The dialog box 721 can be closed by selecting a "Close the Post" icon 733 or tapping out of the gift notification dialog box 721. The dialog box 721 also shows a "Say thank you" icon 735 and a "get it" icon 737 to enable the user to send a Thank you massage to the sender and to redeem the gift at Mangos when the user gets there.

Figure 7C:
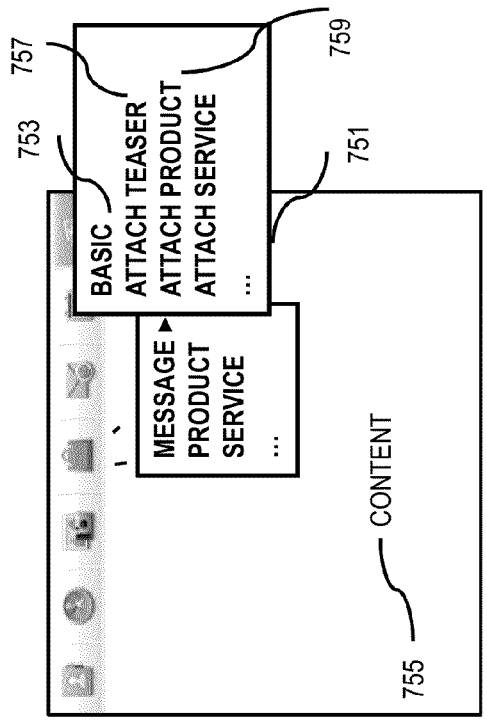

Instead of sending a Thank you message, the user can leave a gift to the sender at Mangos. A user interface 740 with a tab bar 741 having a "gift" tab 743 is shown in FIG. 7C. A posting dialog box 745 is also shown in FIG. 7C. In one embodiment, the posting dialog box 745 contains options of "Message," "Product," "Service," etc. for the user to select. When the user touches one option with a finger, a curser, etc, the option becomes highlighted and the relevant content or description of the option 747 is shown on the screen.

Figure 7D:
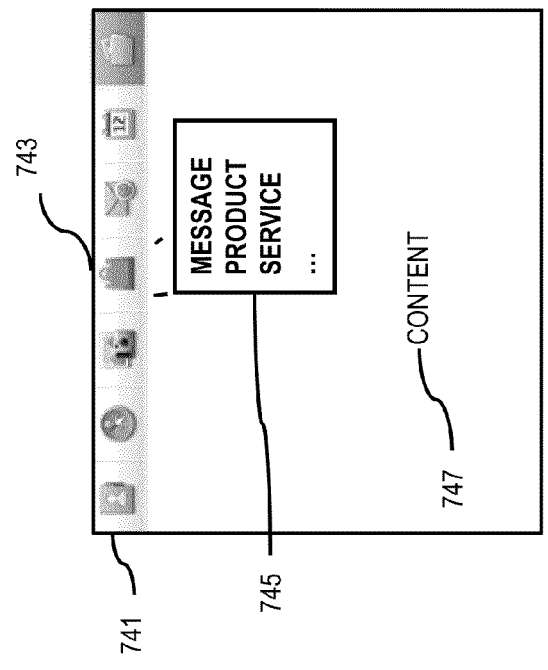

By way of example, when the option of "Message" is selected, a message dialog box 751 pops up in the user interface 750 of FIG. 7D with sub-options of "Basic", "Attach Teaser," "Attach Product," "Attach Service," etc. When the sup-option of "Basic" 753 is selected, the sub-option becomes highlighted and the relevant content or description of the option 755 is shown on the screen. The description explains that the basic massage sub-option triggers a basic dialog box for the user to enter comments about the location, the products/services available there, etc. for completing or otherwise accessing a location-based transaction.

When the user selects the option of "Attach Teaser" 757, the system automatically retrieves the relevant description about the location into a message for a user to post at the location. When the user selects the option of "Attach Product" 759, a product location dialog box 761 pops up in a user interface 760 of FIG. 7E. The product location dialog box 761 contains options of "Available Here", "Other Location," etc.

for the user to select. When the option of "Available Here" 763 is selected, a product category dialog box 765 pops up with options of "Food," "Drink," "Party Room," "Souvenirs," etc. to describe the location-based transaction.

When the sup-option of "Souvenirs" 767 is selected, the sub-option becomes highlighted and the relevant content or description of the option 769 is shown on the screen. The description explains that there are t-shirts with different designs available for sale. Meanwhile, a new screen 770 is triggered to show the different t-shirt designs in a user interface 770 of FIG. 7F. The screen 770 also shows a banner 771 of "Select a Design, $12 per T-shirt." When the user selects the design of a Concert, the icon 773 is highlighted.

A leave a gift dialog box 780 shown in FIG. 7G with a header "Leave a gift at:" 781 can be triggered by selecting the "Leave a gift" icon 619 shown in FIG. 6A. By way of example, the system 100 is set to use the current location of the user as the gift-leaving location. As a result, Mangos is automatically shown in the location bar 782. Alternatively, the user can type in another location (e.g., the sender's office address) to send a gift.

In this case, the sender (e.g., Gary Leahey) is set as the gift recipient. Alternatively, the user can type the sender's name in a recipient entry 783 or select the Contacts icon 784 to call out a Contacts screen to select a contact therefrom. The user can also select a gift tab 785 for attaching the gift (e.g., the T-shirt with the "concert" design) to a message 786, enter the message, and select a Post icon 787 to leave the gift with a message. If the user wants to leave another gift to the same person or leave a gift to another person at Mangos, the user just selects a Next icon 788 to proceed to leaving the next gift.

All the user interface elements (e.g., menu items, markers, icons, entries, headers, etc.) presented on the user interface may be a single div or a JavaScript object. As noted above, the menu items may be utilized to create an interactive menu, and the interactive menu can include the posting service of the system 100 and other services. The other services may be associated with the posting service or other web pages (e.g., an online media store, ecommerce websites, social network, merchant menus, PayPal®, etc.).

By way of example, the sender can browse the merchant's menu of Mangos to select the drink Nuoc mia to leave to the user as a gift, and pay for the gift within the system 100. The other services (e.g., credit card company, PayPal®, etc.) can be presented in another section of the user interface and/or another screen. This other section can be different or distinct from the section representing the posting service. As the user selects menu items from the interactive menu, the user is presented with menus leading to other services (e.g., chocolate website, the Ovi store, EBay®, etc.) that are available to the user based, at least in part, on the current location of the user. The links to the other services may be presented in and/or mush up with the same user interface as the posting service. In another embodiment, the presentation of the other services takes place in a separate section or screen of the websites of the other services (merchants' websites, PayPal's website, etc.).

The option menu and interactive menus reflect the posting services and the other services available in the respective areas and locations. For example, a submenu of user interface is associated with the other services (e.g., maps, navigation, and local search services or content). The submenu items may be represented as graphical icons, text menu items, or both. It is contemplated that the services may be depicted or represented using any type of user interface element. Further, the other services selected can be presented in a separate section of the web browser in the language associated with the location. In one embodiment, the user interface of the system 100 automatically display in the language spoken at the user's current location. The option menu and interactive menus are also in that language.

By analogy, the user can leave a message to the sender at Mangos or another location. A leave a leaving post dialog box 790 is shown in FIG. 7H with a header "Leave a post at:" 791. The leaving post dialog box 790 can be triggered by selecting the "Leave a post" icon 617 shown in FIG. 6A. A Search icon 792 is provided for the user to retrieve another location than the current location as a location for posting the message. The system 100 can search in a local or external database for the location. The local database may be the user's calendar, contacts, email box that contain location information. The external database may be a social network website, a navigation website, etc that contain location information. By way of example, the user can retrieve sender's birthday party address from an email or from an electronic invitation, and set that address to leave a message. As a result, "Maiden St. 45" is shown after the header 791. Alternatively, the user can type in the sender's birthday party address to leave a message.

As another example, after the message, the user can send another message at the birthday party address to one or more other contacts in a recipient entry 793 by selecting contact names (e.g., Jonathan David, Mark Sven . . . ) from a contact screen called through a Contacts icon 794. The user can enter a message 795, attached media files 796 to the message (e.g., two songs, two photos, and no video), and select a Post icon 797 to leave the messages. The leaving post dialog box 790 further displays an Attachment icon 798 for the user to trigger the media file attaching function, as well as an entry 799 showing a total size of the attached files (e.g., 2.6 MB).

Figure 8:
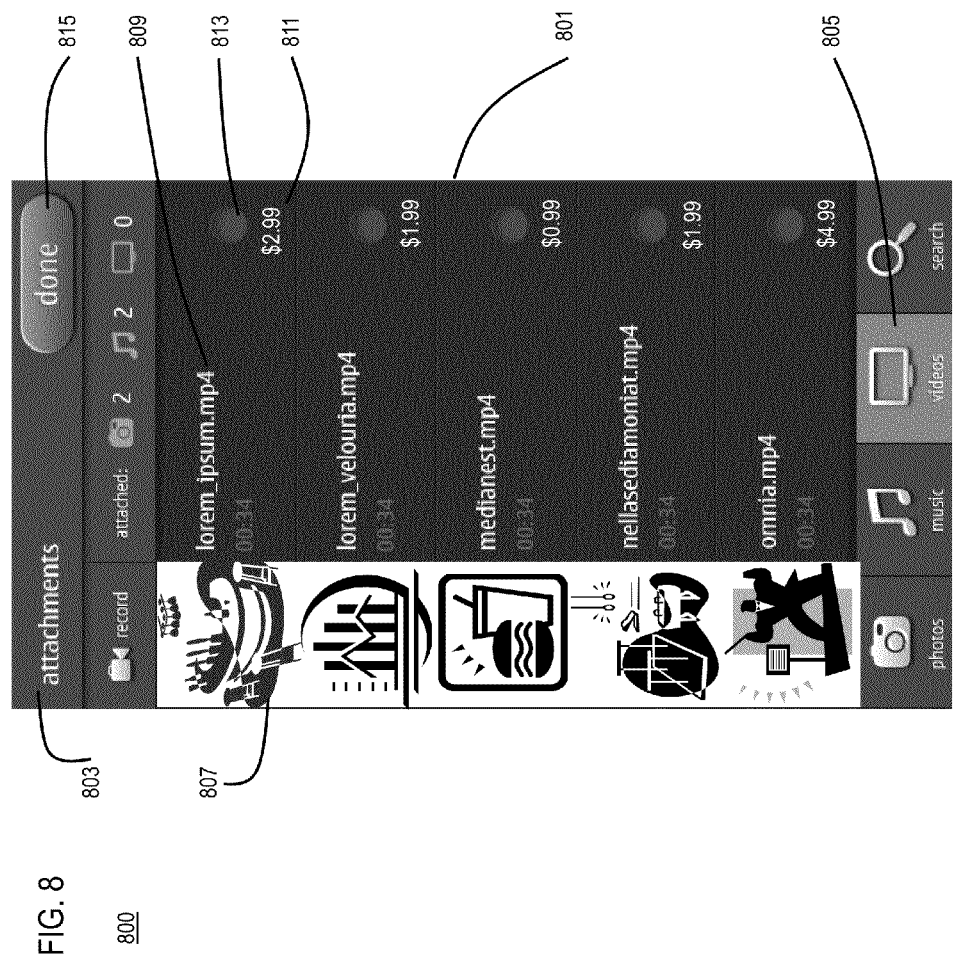
FIG. 8 is a diagram of a user interface showing a merchant menu, according to one embodiment.

FIG. 8 is a diagram of a user interface 800 showing a merchant menu 801, according to one embodiment. The merchant menu 801 is a list of products/services offered at a selected location by a provider, i.e., a Posti registered merchant partner to be promoted by the system 100 to the users. By way of example, after selecting two photos and two songs from the local database, the user wants to attach some commercially available video clips from the merchant menu 801 under a header "Attachment" 803. The user first selects a video icon 805 to retrieve a list of available video clips offered by the partner merchants of the system 100. In one embodiments, the video clips are offered by the merchant operates at the current location or a remote location whether the recipient is going to retrieve a gift. By way of example, the first video clip in the list is a video clip of the Mangos Bar having a representative image 807, a file/product ID 809 (e.g., a title and a length), a price (e.g., $2.99). The user can select a purchase tab 813 to buy the first video clip. After selecting the video, the use selects a Done icon 815 to check out selected items and pay for the selected items. The payment may be submitted atomically via the system 100 by charging the user credit cards, PayPal account as previously set by the user without any further user interaction. In case that the user does not register any payment information with the system 100, a check out and payment screen will be brought up to finish the transaction and then attach the selected video to the message. In another embodiment, a link to the webpage of the video is included in the message to the intended recipient.

Similarly, the user can select and pay for a gift from one or more merchant's menus. The merchant operates at the current location is set as the default merchant to bright out the merchant menu. By way of example, the food/drank menu of Mangos is automatically brought up when the user selects the "Leave a gift" icon. In another embodiment, the user can search and select from another merchant's menu and then requests the gift to be delivered to the current location that the recipient will retrieve the gift.

For example, the recipient is going to have a birthday party at a skating rink, and the user orders a birthday cake from a bakery for the recipient to redeem at the skating rink. The skating ring and the bakery are both partner merchants of the system 100 such that they can get paid for they service automatically. The bakery will be paid for the cake as well as the delivery of the cake, and the skating rink will be paid for receiving and keeping the cake for the recipient.

The merchants can set default rules for delivery and savekeeping the gifts. By way of example, a message expiration date and a gift redemption period are set based upon on the characteristics of product/services, the location operation logistics, etc. After the message expiration date and the gift redemption period, the message or gift is removed from the system 100, and cannot be read or redeemed by the intended recipient. The redemption period for a birthday cake may be set as within 4 hours since it becomes available at the skating rink.

In addition to C2C transactions (e.g., messages/gifts) and/or transaction information, the system 100 also facilitates social and commercial interactions among the providers (B2B) and/or among the providers and the users (B2C and C2B). For example, a company posts at its own stores a location-based transaction (e.g., involving a message/gift) for its loyal customers (e.g., consumers, businesses, etc.). As another example, a consumer posts a location-based message regarding the plumbing problem at his/her house for a plumber to read onsite. As another example, a patent law firm posts a location-based message with delivery instructions at the door for a carrier to deliver patent applications to the Patent Office.

With the above approaches, the location based social commerce platform can provide marketing, advertising, transaction services to the provider to increase location-based transactions, and the provider, in turn, can provide location-centric communication and location-based transactions services to users. A user may be a consumer, a business, a non-profit organization, etc. The above-described embodiments provide means for a provider to post transaction information (e.g., involving a post) for a user (e.g., a customer, business, non-profit organization, etc.) at a specific geographic location, and to complete underlying financial transaction in a simple manner, using a location-aware intermediary processing agent. The above-described embodiments enable a user to select and post transaction information for one or more recipients to retrieve when they are in the vicinity of a certain location. The user can post the transaction information from anywhere (remotely or at the pick-up location), and the recipients will get the transaction information only if they are near or at the location. The above approaches fundamentally enhance social commence and significantly accelerate social commence. The above approaches minimize the user of network resources as well as conserve energy consumption for the platform, the providers, and the users.

The processes described herein for managing location-based transactions may be advantageously implemented via software, hardware, firmware or a combination of software and/or firmware and/or hardware. For example, the processes described herein, including for providing services for managing location-based transactions, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
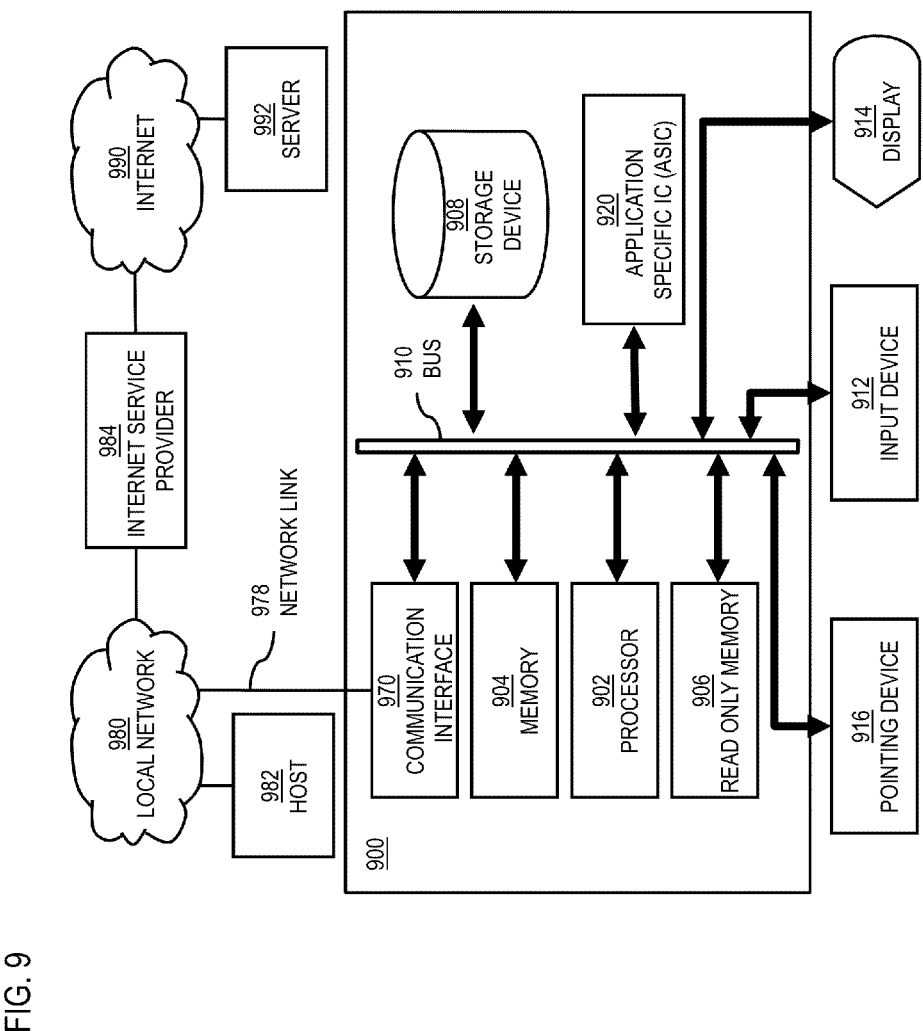
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to manage location-based transactions as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of managing location-based transactions.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to manage location-based transactions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for managing location-based transactions. Dynamic memory enables information stored therein to be changed by the computer system 900. RAM enables a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for managing location-based transactions, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection from the UE 101*a* to the web service platform 103*a* for managing location-based transactions.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to manage location-based transactions as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing services for managing location-based transactions. Chip set or chip 1000, or a portion thereof, constitutes a means for performing one or more steps of managing location-based transactions.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to manage location-based transactions. The memory 1005 also stores the data associated with or generated by the execution of the inventive steps.

Figure 11:
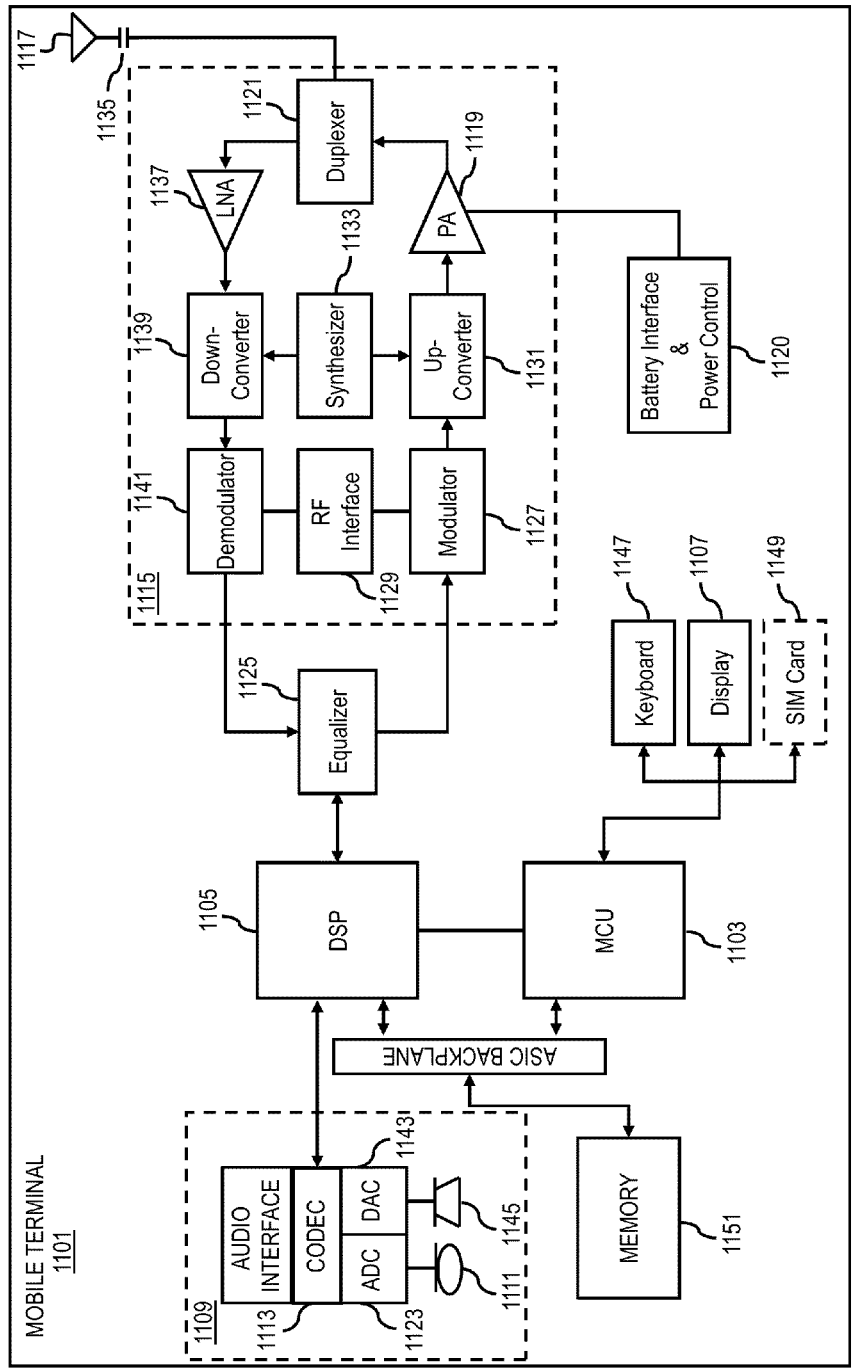
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of managing location-based transactions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of managing location-based transactions. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to manage location-based transactions. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number platform, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating access to at least one interface to allow access to at least one service, the service configured to at least perform the following:

determining by an apparatus to associate transaction information with a geographic location, the transaction information relating to at least one offering that is provided by one or more merchants of the geographic location and that is selected based on one or more offering conditions related at least to the geographic location and paid by the first user for one or more other selected users;

determining by the apparatus to make a notification related to the transaction information accessible to respective devices of the one or more other selected users based, at least in part, on the at least one offering, the one or more offering conditions, and relative locations of the respective devices with respect to the geographic location; and causing, at least in part by the apparatus, a variation of a visual presentation intensity of the notification on a user interface at the respective devices of the one or more other selected users, based on the relative locations of the respective devices as detected by global positioning system receivers built in the respective devices, wherein content of the notification varies based, at least in part, on a length of time passed since the transaction information is associated with the geographic location.

2. A method of claim 1, wherein the service is further configured to perform:

determining to present a user interface specifying one or more products, one or more services, or a combination thereof; and receiving an input for selecting at least one of the one or more products and the one or more services, and for selecting the one or more other selected users, wherein the transaction information is based, at least in part, on the input, and wherein the one or more offering conditions include an expatriation date, a redemption period, a limited quantity, first come first serve, or a combination thereof.

3. A method of claim 2, wherein the service is further configured to perform:

determining to present a user interface specifying one or more social groups, one or more social networks, one or more communities, or a combination thereof; and receiving another input for selecting the one or more other selected users, based on one or more profile conditions, from at least one of the one or more social groups, the one or more social networks, and the one or more communities, wherein the one or more profile conditions include one or more common interests, one or more common activities, one or more common memberships, or a combination thereof.

4. A method of claim 2, wherein the service is further configured to perform:

determining to further present in the user interface one or more templates for the transaction information, the notification, or a combination thereof; and receiving another input for selecting at least one of the one or more templates, wherein the transaction information, the notification, or a combination thereof is based, at least in part, on the at least one of the one or more templates.

5. A method of claim 1, wherein the service is further configured to perform:

determining to identify one or more transactions based, at least in part, on the transaction information;

determining to retrieve payment information associated with the one or more other selected users; and determining to complete the one or more transactions based, at least in part, on the payment information, the transaction information, or a combination thereof.

6. A method of claim 5, wherein the geographic location is a commercial establishment, and the payment information relate to one or more monetary exchange services.

7. A method of claim 6, wherein the service is further configured to perform:

determining access rights to the transaction information, the notification, or a combination thereof based, at least in part, on the geographic location and location information associated with the respective devices.

8. A method of claim 7, wherein the at least one offering relates to one or more products or one or more services redeemable at the geographic location by the one or more other selected users.

9. A method of claim 8, wherein the one or more products or one or more services are redeemable at two or more spots within the geographic location.

10. A method of claim 1, wherein the service is further configured to perform:

determining whether the one or more other selected users are within a predetermined radius of the geographic location, wherein the determining to make the notification accessible is based, at least in part, on the determination with respect to the predetermined radius.

11. A method of claim 1, wherein the service is further configured to perform:

determining whether the one or more other selected users have accessed the transaction information, the notification, or a combination thereof;

updating respective status information for the transaction information, the notification, or a combination thereof based, at least in part, on the determination with respect to access.

12. A method of claim 11, wherein the service is further configured to perform:

determining to present the status information based, at least in part, on location information associated with the respective devices.

13. A method of claim 1, wherein the service is further configured to perform:

determining to search for the geographic location within a calendar, contacts, or email box of the first user.

14. An apparatus comprising:

at least one processor; and at least one memory including computer program code for one or more programs, the at least one memory and the computer program code configured to, with the at least one processor, cause the apparatus to perform at least the following:

determine to associate transaction information with a geographic location, the transaction information relating to at least one offering that is provided by one or more merchants of the geographic location and that is selected based on one or more offering conditions related at least to the geographic location and paid by the first user for one or more other selected users;

determine to make a notification related to the transaction information accessible to respective devices of the one or more other selected users based, at least in part, on the at least one offering, the one or more offering conditions, and relative locations of the respective devices with respect to the geographic location;

cause, at least in part, a variation of a visual presentation intensity of the notification on a user interface at the respective devices of the one or more other selected users, based on the relative locations of the respective devices as detected by global positioning system receivers built in the respective devices; and very content of the notification based, at least in part, on a length of time passed since the transaction information is associated with the geographic location.

15. An apparatus of claim 14, wherein the apparatus is further caused to:
    determine to present a user interface specifying one or more products, one or more services, or a combination thereof; and
    receive an input for selecting at least one of the one or more products and the one or more services, and for selecting the one or more other selected users;
    wherein the transaction information is based, at least in part, on the input, and
    wherein the one or more offering conditions include an expatriation date, a redemption period, a limited quantity, first come first serve, or a combination thereof.

16. An apparatus of claim 15, wherein the apparatus is further caused to:
    determine to further present in the user interface one or more templates for the transaction information, the notification, or a combination thereof; and
    receive another input for selecting at least one of the one or more templates,
    wherein the transaction information, the notification, or a combination thereof is based, at least in part, on the at least one of the one or more templates.

17. An apparatus of claim 14, wherein the apparatus is further caused to:
    determine to identify one or more transactions based, at least in part, on the transaction information;
    determine to retrieve payment information associated with the one or more other selected users;
    determine to complete the one or more transactions based, at least in part, on the payment information, the transaction information, or a combination thereof.

18. An apparatus of claim 17, wherein the apparatus is further caused to:
    determine whether the one or more other selected users are within a predetermined radius of the geographic location,
    wherein the determining to make the notification accessible is based, at least in part, on the determination with respect to the predetermined radius.

19. An apparatus of claim 14, wherein the apparatus is further caused to:
    determine access rights to the transaction information, the notification, or a combination thereof based, at least in part, on the geographic location and location information associated with the respective devices.

* * * * *